US012524242B2

(12) United States Patent
Nouvel et al.

(10) Patent No.: US 12,524,242 B2
(45) Date of Patent: Jan. 13, 2026

(54) REGISTER CLEARING

(71) Applicant: Arm Limited, Cambridge (GB)

(72) Inventors: Quentin Éric Nouvel, Antibes (FR); Luca Nassi, Antibes (FR); Albin Pierrick Tonnerre, Antibes (FR); Geoffray Matthieu Lacourba, Antibes (FR)

(73) Assignee: Arm Limited, Cambridge (GB)

( * ) Notice: Subject to any disclaimer, the term of this patent is extended or adjusted under 35 U.S.C. 154(b) by 175 days.

(21) Appl. No.: 18/448,240

(22) Filed: Aug. 11, 2023

(65) Prior Publication Data

US 2025/0053421 A1 Feb. 13, 2025

(51) Int. Cl.
*G06F 9/38* (2018.01)
*G06F 9/30* (2018.01)

(52) U.S. Cl.
CPC ............ *G06F 9/384* (2013.01); *G06F 9/3013* (2013.01)

(58) Field of Classification Search
CPC ...................................................... G06F 9/384
See application file for complete search history.

(56) References Cited

U.S. PATENT DOCUMENTS

| 5,471,633 A | * | 11/1995 | Colwell ................ G06F 9/3854 712/216 |
| 7,355,602 B1 | * | 4/2008 | Kilgard ................... G06T 11/40 345/530 |
| 7,568,089 B1 | * | 7/2009 | Favor ..................... G06F 9/3863 712/228 |
| 2019/0018686 A1 | * | 1/2019 | Jaubert ............... G06F 9/30098 |
| 2020/0319885 A1 | * | 10/2020 | Eyole .................. G06F 9/30098 |
| 2022/0137966 A1 | * | 5/2022 | Song ...................... G06F 9/384 712/225 |

* cited by examiner

*Primary Examiner* — Michael J Metzger
(74) *Attorney, Agent, or Firm* — NIXON & VANDERHYE P.C.

(57) ABSTRACT

An apparatus comprises at least one register rename table structure comprising rename entries for indicating register mappings between architectural registers and corresponding physical registers, and register rename circuitry to update the register mappings indicated by the rename entries. Rename entries corresponding to at least one set of architectural registers support a cleared-register encoding. In response to an operation specifying a source architectural register for which a corresponding rename entry is set to the cleared-register encoding, the register rename circuitry controls the processing circuitry to process that operation with a source operand corresponding to the source architectural register being treated as having a predetermined value. In response to detection of a register clearing event indicating that at least one set of architectural registers is to be treated as having been cleared to the predetermined value, the register rename circuitry sets rename entries corresponding to the at least one set of architectural registers to the cleared-register encoding.

19 Claims, 15 Drawing Sheets

REGISTER CLEARING

BACKGROUND

Technical Field

The present technique relates to the field of data processing.

Technical Background

An apparatus for data processing may have register rename circuitry for mapping architectural registers identified by instructions to physical registers provided in hardware. Register renaming can be useful, for example, in an out-of-order processor to improve performance by removing some false register dependencies between instructions, to increase opportunities for a younger instruction in program order to bypass an older instruction in the program order.

SUMMARY

At least some examples of the present technique provide an apparatus comprising:
   at least one register rename table structure comprising rename entries for indicating register mappings between architectural registers specified by operations to be processed by processing circuitry and corresponding physical registers provided in hardware; and
   register rename circuitry to update the register mappings indicated by the rename entries of the at least one register rename table structure; in which:
   rename entries corresponding to at least one set of architectural registers support a cleared-register encoding;
   in response to an operation specifying a source architectural register for which a corresponding rename entry is set to the cleared-register encoding, the register rename circuitry is configured to control the processing circuitry to process that operation with a source operand corresponding to the source architectural register being treated as having a predetermined value; and
   in response to detection of a register clearing event indicating that at least one set of architectural registers is to be treated as having been cleared to the predetermined value, the register rename circuitry is configured to set a plurality of rename entries of the at least one register rename table to the cleared-register encoding, the plurality of rename entries corresponding to architectural registers in said at least one set of architectural registers.

At least some examples of the present technique provide a system comprising: the apparatus described above, implemented in at least one packaged chip; at least one system component; and a board, wherein the at least one packaged chip and the at least one system component are assembled on the board.

At least some examples of the present technique provide a chip-containing product comprising the system described above assembled on a further board with at least one other product component.

At least some examples of the present technique provide a non-transitory computer-readable medium to store computer-readable code for fabrication of an apparatus comprising:
   at least one register rename table structure comprising rename entries for indicating register mappings between architectural registers specified by operations to be processed by processing circuitry and corresponding physical registers provided in hardware; and
   register rename circuitry to update the register mappings indicated by the rename entries of the at least one register rename table structure; in which:
   rename entries corresponding to at least one set of architectural registers support a cleared-register encoding;
   in response to an operation specifying a source architectural register for which a corresponding rename entry is set to the cleared-register encoding, the register rename circuitry is configured to control the processing circuitry to process that operation with a source operand corresponding to the source architectural register being treated as having a predetermined value; and
   in response to detection of a register clearing event indicating that at least one set of architectural registers is to be treated as having been cleared to the predetermined value, the register rename circuitry is configured to set a plurality of rename entries of the at least one register rename table to the cleared-register encoding, the plurality of rename entries corresponding to architectural registers in said at least one set of architectural registers.

At least some examples of the present technique provide a method comprising:
   maintaining at least one register rename table structure comprising rename entries for indicating register mappings between architectural registers specified by operations to be processed by processing circuitry and corresponding physical registers provided in hardware, where rename entries corresponding to at least one set of architectural registers support a cleared-register encoding;
   in response to an operation specifying a source architectural register for which a corresponding rename entry is set to the cleared-register encoding, controlling processing circuitry to process that operation with a source operand corresponding to the source architectural register being treated as having a predetermined value; and
   in response to detection of a register clearing event indicating that at least one set of architectural registers is to be treated as having been cleared to the predetermined value, setting a plurality of rename entries of the at least one register rename table to the cleared-register encoding, the plurality of rename entries corresponding to architectural registers in said at least one set of architectural registers.

Further aspects, features and advantages of the present technique will be apparent from the following description of examples, which is to be read in conjunction with the accompanying drawings.

DESCRIPTION OF EXAMPLES

Figure 1:
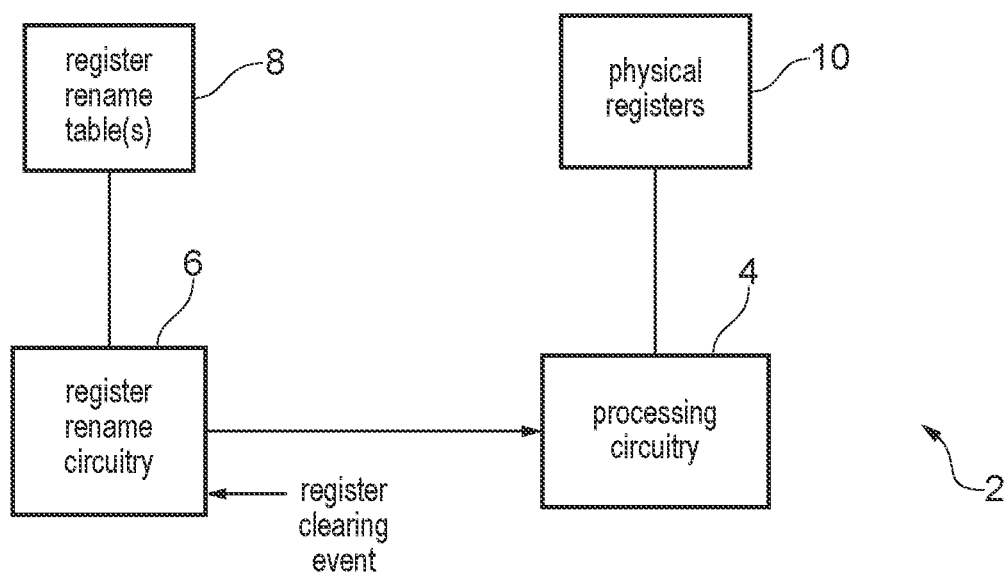
FIG. 1 illustrates an example of an apparatus comprising register rename circuitry.

An apparatus comprises at least one register rename table structure comprising rename entries for indicating register mappings between architectural registers specified by operations to be processed by processing circuitry and corresponding physical registers provided in hardware; and register rename circuitry to update the register mappings indicated by the rename entries of the at least one register rename table structure. Providing support for register renaming can be useful for supporting out-of-order processing and improving performance, by enabling some false register dependencies between instructions to be removed (in particular, those false dependencies which arise when, due to the limited number of architectural registers available in an instruction set architecture supported by the processing circuitry, two instructions use the same architectural register number to refer to different variables and so are not actually dependent on each other). Removing such dependencies by mapping the architectural registers to different physical registers can increase opportunities for a younger instruction in program order to bypass an older instruction in the program order when the older instruction is stalled awaiting operands, thus improving performance.

Sometimes, a register clearing event may occur indicating that at least one set of architectural registers is to be treated as having been cleared to a predetermined value. For example, the register clearing event may be an architecturally defined event (one defined as having certain effects in an instruction set architecture). Software developers will therefore understand that after such an event they cannot rely on the previous contents of the at least one set of architectural registers still being available. Providing architectural support for such a register clearing event can be useful to support more flexible micro-architectural implementations of processors implementing the instruction set architecture, because it means that the micro-architecture designer does not need to implement mechanisms that ensure that the data values corresponding to the at least one set of architectural registers remain available after the register clearing event.

One way of handling the register clearing event could be to write the predetermined value to each physical register mapped to the at least one set of architectural registers, to overwrite the current contents of those physical registers. However, this approach would incur a relatively large performance cost, as the register write bandwidth available for writing to registers in the physical register files would be occupied for some time with write operations merely for clearing registers to the predetermined value, which would delay other operations such as arithmetic operations or load operations (not only because they cannot access write bandwidth for their destination register writes, but also because if the register clearing writes for architectural registers are still pending, subsequent instructions which reference those architectural registers may be delayed to avoid read-after-write hazards). Also, such register clearing writes to the physical register file may increase power consumption.

In the techniques discussed below, the register clearing event is instead handled by exploiting the rename entries maintained by the register rename circuitry. Rename entries corresponding to at least one set of architectural registers support a cleared-register encoding. In response to an operation specifying a source architectural register for which a corresponding rename entry is set to the cleared-register encoding, the register rename circuitry controls the processing circuitry to process that operation with a source operand corresponding to the source architectural register being treated as having a predetermined value. In response to detection of a register clearing event indicating that at least one set of architectural registers is to be treated as having been cleared to the predetermined value, the register rename circuitry sets a plurality of rename entries of the at least one register rename table to the cleared-register encoding. The rename entries set to the cleared-register encoding are rename entries which correspond to architectural registers in the at least one set of architectural registers.

With this approach, the register clearing event can typically be handled much faster and with lower power cost than if the physical registers corresponding to the cleared architectural registers were actually overwritten. Rename entries may typically have fewer bits than the physical registers themselves and so can more efficiently be set to the cleared-register encoding. As there is no need to update any physical registers to clear them to the predetermined value, this avoids consuming write bandwidth to the physical register file(s), which may be at a premium and may be better utilised for writing results of functional instructions such as arithmetic or load instructions. Instead of actually clearing physical registers, a rename entry can be set to the cleared-register encoding and when a subsequent operation specifies for its source operand a source architectural register for which the corresponding rename entry is set to the cleared-register encoding, the processing circuitry can be controlled to obtain, as the source operand value, the predetermined value instead of reading a value from a physical register. This enables improved performance and reduced power consumption.

When the register rename circuitry controls the processing circuitry to process an operation with a source operand being treated as having a predetermined value, this control may in some instances be indirect, in that the register rename circuitry may set some information which is then used by downstream circuitry to select the source operand value. For example, the register rename circuitry may provide the downstream circuitry with an indication of the current register mapping specified by the rename entry corresponding to the source architectural register, and so when that rename entry has the cleared-register encoding, the indication of the current register mapping may similarly have an encoding indicating that the source architectural register is treated as cleared to the predetermined value. Hence, when the downstream circuitry selects the source operand value, if the indication of current register mapping received from the register rename circuitry has the encoding indicating a cleared register, then the downstream circuitry may select the predetermined value as the source operand value (instead of selecting a value read from a physical register corresponding to the source architectural register). For example, the downstream circuitry could be issue circuitry responsible for issuing operations for execution by the processing circuitry, or could be part of the processing circuitry itself (e.g. an execute stage of a processing pipeline). Hence, for a source architectural register indicated as corresponding to a rename entry having the cleared-register encoding, there is no need for the downstream circuitry to trigger any read to a physical register.

In some examples, the register rename circuitry may set the plurality of rename entries to the cleared-register encoding in response to a single micro-operation representing the register clearing event. Hence, multiple rename entries may be updated in response to a single micro-operation. This may be relatively unusual as in typical register rename implementations there may normally be a single rename entry update in response to a given micro-operation (as typically there is one rename entry per destination register of a program instruction, and if the program instruction requires multiple destination registers then this would typically be cracked into separate micro-operations at a decode stage preceding the register rename stage). However, for the register clearing events, the number of architectural registers to be treated as cleared to the predetermined value may be relatively large, and so even if the register rename circuitry has support for handling rename for multiple micro-operations in parallel in the same cycle, if the rename entry update for each architectural register to be set to the cleared-register encoding has to be handled as a response to a separate micro-operation, this may occupy available rename bandwidth for many cycles, causing a delay in processing of other operations, which would impact performance. The inventors recognised that a hardware mechanism can be provided by which the register rename circuitry can update many rename entries to the cleared-register encoding in response to a single micro-operation, which can greatly improve performance.

The cleared-register encoding could be implemented in different ways. For example, a given rename entry may be treated as having the cleared-register encoding when it specifies a predetermined value or pattern of bits, or when a physical register identifier of the rename entry is set to a predetermined reserved value (different from physical register identifiers used to identify real physical registers provided in hardware).

However, in some examples, the rename entries corresponding to the at least one set of architectural registers each comprise a cleared-register bit, and the cleared-register encoding comprises an encoding in which the cleared-register bit is set to a predetermined value. By using a cleared-register bit to indicate whether the rename entry has the cleared-register encoding, this can simplify the circuit logic for setting the rename entry to the cleared-register encoding and for determining whether to obtain the predetermined value for a given source operand, reducing the circuit area and power consumed by that circuit logic.

Using a cleared-register bit can also make it more feasible for the register rename circuitry to update all the rename entries required to be set to the cleared-register encoding in response to a single micro-operation. For example, the at least one register rename table structure may have at least one write port configured to control setting of the cleared-register bits in two or more of the plurality of rename entries in response to a single trigger signal input to the at least one write port. Hence, there may be a write port input which may trigger the setting of the cleared-register bits in multiple rename entries in a single request, rather than requiring separate requests for each individual rename entry that is to be set to the cleared-register encoding.

Nevertheless, other implementations could use a multi-bit value to indicate whether a rename entry has the cleared-register encoding, with certain encodings of that multi-bit value representing the cleared-register encoding. For example, the field indicating whether the rename entry has the cleared-register encoding could be shared with other information.

The at least one register rename table structure mentioned earlier may not be the only rename table structure supporting the cleared-register encoding. The at least one register rename table structure may be used as at least one speculative register rename table structure comprising rename entries for indicating speculative register mappings for speculatively processed operations. There may also be at least one architectural rename table structure comprising rename entries for indicating committed register mappings associated with a commit point of program flow. The commit point of program flow may be a point of program flow corresponding to the youngest operation in program order that has been committed. An operation may be considered committed once it is known that its execution would give the architecturally correct outcome. Register commit circuitry may be provided for maintaining the committed register mappings indicated by the architectural rename table structure(s).

Providing separate speculative and architectural register rename table structures can be useful for dealing with flush events, when a prediction used as basis for speculation is determined to be incorrect and so operations are flushed from the pipeline and register state is reset to state associated with an earlier point of program flow before misprediction. To support the register clearing event, both the speculative and architectural register rename table structures may have rename entries corresponding to the at least one set of architectural registers which support the cleared-register encoding. Although in some examples the rename entries supporting the cleared-register encoding may have the same format in both the speculative rename table structure and the corresponding architectural rename table structure, this is not essential and other examples may use a different encoding format for rename entries having the cleared-register encoding in the speculative rename table structure compared to rename entries having the cleared-register encoding in the architectural rename table structure.

In response to detection that the commit point of program flow has reached a point of program flow at which the register clearing event occurred, the register commit circuitry may set a plurality of rename entries of the at least one architectural rename table structure to the cleared-register encoding (again, those plurality of rename entries may correspond to the at least one set of architectural registers to be treated as cleared to the predetermined value in response to the register clearing event). Hence, in a similar way to the register rename circuitry setting rename entries of the speculative rename table structure(s) to the cleared-register encoding when a speculative point of program flow reaches a point of program flow at which the register clearing event occurred, in a corresponding way the register commit circuitry sets rename entries of the architectural rename table structure(s) to the cleared-register encoding when the commit point of program flow reaches the point at which the register clearing event occurred (the commit point of program flow reaches the register clearing event at a later time than the time when the speculative point of program flow reaches the register clearing event).

As for the update of the at least one (speculative) rename table structure by the register rename circuitry, when updating rename entries of the architectural rename table structure (s), the register commit circuitry may trigger updating of multiple rename entries to the cleared-register encoding in response to a single micro-operation.

When the register commit circuitry sets one or more sets of rename entries of the architectural rename table structure (s) to the cleared-register encoding, this indicates that, at the commit point of program flow, the corresponding architectural registers are no longer mapped to any particular physical register, since the cleared-register encoding indicates that a subsequent operation referencing the architectural register as its source operand would receive the predetermined value as the source operand instead of a value read from the physical register file. One would expect that, therefore, any physical register previously mapped to the corresponding architectural register in the architectural rename table structure could then be freed for reallocation to a different architectural register.

However, the inventors recognised that since multiple rename entries may all be set to the cleared-register encoding in response to a single event (the indication that the commit point of program flow has reached the point at which the register clearing event occurred), this may require many physical registers to be freed for reallocation in response to a single micro-operation reaching the commit stage. Typically, the register commit circuitry may only have bandwidth for a limited number of register freeing operations per cycle, and so if the physical registers previously specified by the architectural rename entries were freed at the time that those rename entries are updated to the cleared-register encoding, this may consume register freeing bandwidth for many cycles which may be harmful to performance. It may be undesirable to have to increase the register reclaim bandwidth solely to handle the increased load associated with freeing registers following a register clearing event becoming committed, as this would incur a significant circuit area and power cost and the increased circuit logic available to handle that temporary requirement for increased register freeing bandwidth may be unlikely to be needed during the majority of cycles when there is no register clearing event committed.

Hence, in some examples, following a given rename entry of the at least one architectural rename table being set to the cleared-register encoding (the given rename entry being a rename entry which corresponds to a given architectural register and specifies the given architectural register as being mapped to a given physical register prior to being set to the cleared-register encoding), the register commit circuitry may defer freeing the given physical register until after commitment of a subsequent operation that is younger than the point of program flow at which the register clearing event occurred and specifies the given architectural register as a destination register (freeing the given physical register comprises making the given physical register available for reallocation to another architectural register). This allows the register reclaim operations associated with each of the architectural rename table entries set to the cleared-register encoding to be distributed in time as each entry's reclaim operation is deferred to the point at which a subsequent operation is committed which has the corresponding architectural register as a destination register. Hence, the peak reclaim bandwidth needed is lower and so register commit circuitry with lower maximum reclaim bandwidth can be used, saving circuit area and reducing power consumption.

The register commit circuitry may be responsive to an operation being committed which specifies a given architectural register as a destination register, when a given rename entry of the at least one register rename table structure corresponding to the given architectural register is set to the cleared-register encoding, to: free, for reallocation to a new architectural register, a previously mapped physical register previously specified by the given rename entry as being mapped to the given architectural register prior to the given rename entry being set to the cleared-register encoding; and set the given rename entry to an encoding other than the cleared-register encoding.

The cleared-register encoding of a rename entry of the at least one architectural rename table structure may have a format which identifies the physical register previously mapped to the corresponding architectural register before that rename entry was set the cleared-register encoding. Hence, even though that physical register is no longer committed as being mapped to the corresponding architectural register, its physical register identifier is retained in the rename entry so that the freeing of that physical register can be deferred to the point at which a subsequent operation writing to the corresponding architectural register is committed.

Flush control circuitry may be provided, which is responsive to a flush event for triggering flushing of operations beyond a flush point of program flow to cause the at least one speculative register rename table structure to be reset based on the committed register mappings indicated in the at least one architectural rename table structure, and to rebuild the at least one speculative register rename table structure based on register mappings indicated by a register commit queue as being associated with points of program flow between the commit point and the flush point in program order. When rebuilding the at least one speculative register rename table, in response to detection that the register clearing event occurred at a point of program flow between the commit point of program flow and the flush point of program flow, the flush control circuitry may set the plurality of rename entries of the register rename table to the cleared-register encoding.

The register commit circuitry and flush control circuitry may detect the point of program flow at which the register clearing event occurred in different ways. Some examples could, for example, check an identifier stored in a buffer which represents the point of program flow where the register clearing event occurred (e.g. an instruction identifier of the instruction which caused the register clearing event to happen).

However, an efficient approach can be to provide a register commit queue comprising register mapping entries representing a queue of register mappings associated with respective points of program flow. The register rename circuitry may be responsive to detection of the register clearing event to allocate, to the register commit queue, a register clearing entry indicative of a point of program flow at which the register clearing event occurred. The register commit circuitry may detect, based on the register clearing entry, a point of program flow at which the register clearing event occurred. Similarly, the flush control circuitry may detect, based on the register clearing entry, a point of program flow at which the register clearing event occurred. This approach avoids a need to compare instruction identifiers or other identifiers associated with operations for identifying relative order of operations. Instead, the position of register mapping entries in the register commit queue can be used to derive information on whether corresponding operations are younger or older than another. The register commit circuitry and flush control circuitry may process register mapping entries from the register commit queue sequentially. Hence, by allocating a "register clearing event" type of entry to the register commit queue which does not represent a standard mapping from an architectural register to a corresponding physical register, but instead represents that the register clearing event occurred, this provides an efficient way of enabling the commit/flush circuitry operating at a later pipeline stage of a processing pipeline to detect the point of program flow at which the register rename circuitry operating at an earlier pipeline stage detected a register clearing event.

The register clearing event can be any event which requires multiple architectural registers to be treated as having been cleared to a predetermined value. The predetermined value could, for example, be zero. Alternatively, the predetermined value could be a predetermined non-zero value (e.g. a value for which all bits are set to 1).

In one example, the register clearing event may comprise a mode change of the processing circuitry between a first mode and a second mode. The processing circuitry may trigger the mode change in response to a mode changing program instruction included in a stream of instructions to be executed by the processing circuitry. The single micro-operation mentioned above for triggering setting of multiple rename entries to the cleared-register encoding can be generated by instruction decoding circuitry in response to this mode changing program instruction.

For example, the processing circuitry may have architecturally defined modes associated with different usage of architectural registers. It may be useful to provide the register clearing event to ensure that after a mode switch, software executing in one mode does not rely on architectural state for at least one set of architectural registers still being available associated with operations performed in a different mode prior to the mode switch. This can provide greater flexibility for micro-architectural implementations so that they can, if desired, choose not to implement mechanisms for retaining the architectural state across the mode switch, which can help to enable less complex micro-architectural implementations compliant with the architecture, as circuit logic, power and performance costs associated with maintenance of register state across the mode switch can be avoided.

In some examples, the first mode and the second mode may be associated with different register lengths for at least a subset of the at least one set of architectural registers. While some micro-architectural implementations could implement the variable register lengths by mapping shorter and longer architectural registers associated with the respective modes onto portions of the same physical register file in both modes, other micro-architectural implementations could choose to map the same architectural registers onto physically distinct register files in the first and second modes respectively. Without the register clearing event, there could be a risk that a software developer would expect an instruction executing after the mode change to be able to read an operand from an architectural register written to by an instruction executing before the mode change, which would imply that a micro-architecture design using separate physical register files for the two modes may need to implement a mechanism for transferring register state between the register files on the mode switch. Such a register state transfer mechanism may be relatively costly to implement in terms of power consumption and performance. By providing the register clearing event, the micro-architecture designer has the choice of not implementing that register state transfer mechanism because software cannot rely on state from before the mode switch still being available after the mode switch. Hence, the techniques discussed above are particularly useful for systems supporting first and second modes associated with different register lengths.

In some examples, in the second mode, the processing circuitry may offload for processing by an external processing unit at least one class of operations which in the first mode would be processed by the processing circuitry. Similar to the variable register length example discussed above, in a system where operations are processed by different physical processing units in the first and second modes, without the register clearing event there may be a need to implement a register state transfer mechanism, but this can be avoided because the register clearing event triggered by the mode switch means software will not rely on state from before the mode switch remaining available. Hence, the techniques for using the register rename circuitry to enforce register clearing can be particularly useful for a system where a class of operations can be either processed by the processing circuitry in a first mode or offloaded to an external processing unit in a second mode.

The system may support more than one set of architectural registers and the register clearing event may not need to cause all sets of architectural registers to be reset. For example, an architecture may support general purpose scalar architectural registers, vector architectural registers and predicate architectural registers. If the class of operations associated with different processing in the first and second modes are vector operations, then these operations may reference the vector architectural registers and the predicate architectural registers, but not the general purpose scalar architectural registers, so it may not be necessary to clear the general purpose scalar architectural registers to the predetermined value in response to register clearing event. Hence there may be some types of architectural registers which are not treated as cleared to the predetermined value despite occurrence of the register clearing event, and which therefore continue to retain their register state so that state may be available for reading as source operands by operations processed after the register clearing event.

Where the register clearing event is triggered by a mode switch between a first mode and a second mode, that mode switch could be either a switch from the first mode to the second mode or a switch from the second mode to the first mode. In some examples, the set of rename entries set to the cleared-register encoding may be the same both for the switch from the first mode to the second mode and the switch from the second mode to the first mode. For example, an instruction set architecture may prescribe that a certain set of registers is to be cleared in response to both directions of mode switch.

However, for other examples the set(s) of architectural registers for which the corresponding rename entries are set to the cleared-register encoding may differ depending on whether the mode switch is from the first mode to the second mode or from the second mode to the first mode. This may be the case even if the instruction set architecture definition of the register clearing event is such that the same sets of architectural registers may be architecturally required to be cleared to the predetermined value in response to both directions of mode switch. This recognises that if in a particular one of the first and second modes, there is a set of architectural registers which would not be referenced by any instruction executed in that mode, then having logically cleared to those architectural registers to the predetermined value by setting the corresponding rename entries to the cleared-register encoding on entering that mode, the corresponding architectural registers will still have their rename entries set to the cleared-register encoding leaving that mode and so there is no need to perform a further update for clearing those registers on exiting that mode.

This can be particularly useful in an implementation which offloads at least one class of operations to an external processing unit in the second mode. For example, the at least one set of architectural registers may include a first set of architectural registers, where the register rename circuitry is responsible for selecting register mappings for the first set of architectural registers in the first mode, and in the second mode the register rename circuitry is not responsible for selecting register mappings for the first set of architectural registers because operations specifying the first set of architectural registers are to be offloaded to the external processing unit in the second mode. For example, the external processing unit may be an in-order processing unit which does not carry out rename operations at all (as architectural registers and physical registers have a one-to-one mapping for the in-order processing unit), or the external processing unit may have its own register rename circuitry for selecting register mappings for operations processed on the external processing unit during the second mode. Hence, during the second mode, the rename circuitry associated with the processing circuitry may not need to carry out any further updates to rename entries associated with the first set of architectural registers while in the second mode. Therefore, setting those rename entries to the cleared-register encoding on entry to the second mode will mean that on exit from the second mode back to the first mode, those rename entries are still set to the cleared-register encoding and a further update is not required.

Hence, for a register clearing event comprising a mode change from the first mode to the second mode, the plurality of rename entries set to the cleared-register encoding may comprise rename entries corresponding to the first set of architectural registers, but for a register clearing event comprising a mode change from the second mode to the first mode, the plurality of rename entries set to the cleared-register encoding may exclude rename entries corresponding to the first set of architectural registers. By avoiding updates to the rename entries if it is known that they cannot have changed since a previous update on switching to the second mode, this saves power by reducing unnecessary writes to the rename table structure.

On the other hand, for both the mode change from the first mode to the second mode and the mode change from the second mode to the first mode, the plurality of rename entries set to the cleared-register encoding may include rename entries corresponding to a second set of architectural registers for which the register rename circuitry is responsible for selecting register mappings in both the first mode and the second mode.

For example, the first set of architectural registers may comprise vector registers. The second set of architectural registers may comprise predicate registers.

Specific examples will now be described with reference to the drawings.

FIG. 1 schematically illustrates an example of an apparatus 2 having processing circuitry 4 for performing data processing operations in response to decoded instructions, and register rename circuitry 6 for performing register renaming to map architectural registers specified by the instructions to physical registers 10 provided in hardware. The register rename circuitry 6 maintains at least one register rename table structure 8 for providing rename entries which indicate register mappings between architectural registers and corresponding physical registers. In response to detection of a register clearing event, which indicates that at least one set of architectural registers is to be treated as having been cleared to the predetermined value, the register rename circuitry 6 sets at least some rename entries (corresponding to registers in the at least one set of architectural registers) of the rename tables 8 to a cleared-register encoding. For an operation specifying a source architectural register for which a corresponding rename entries currently set to the cleared-register encoding, the register rename circuitry 6 controls the processing circuitry 4 to process that operation with a source operand corresponding to the source architectural register be treated as having the predetermined value. This avoids the need for multiple physical registers of the physical register file 10 to actually be overwritten with the predetermined value in order to implement the register clearing event. The use of register renaming to implement the register clearing means that the effect of register clearing can be achieved with fewer bits of stored state needing to be updated (the register rename entries of the rename tables 8 may typically have fewer bits than the physical registers themselves, and it may be that not all of the bits of the rename entries need to be updated when setting those entries to the cleared-register encoding).

Figure 2:
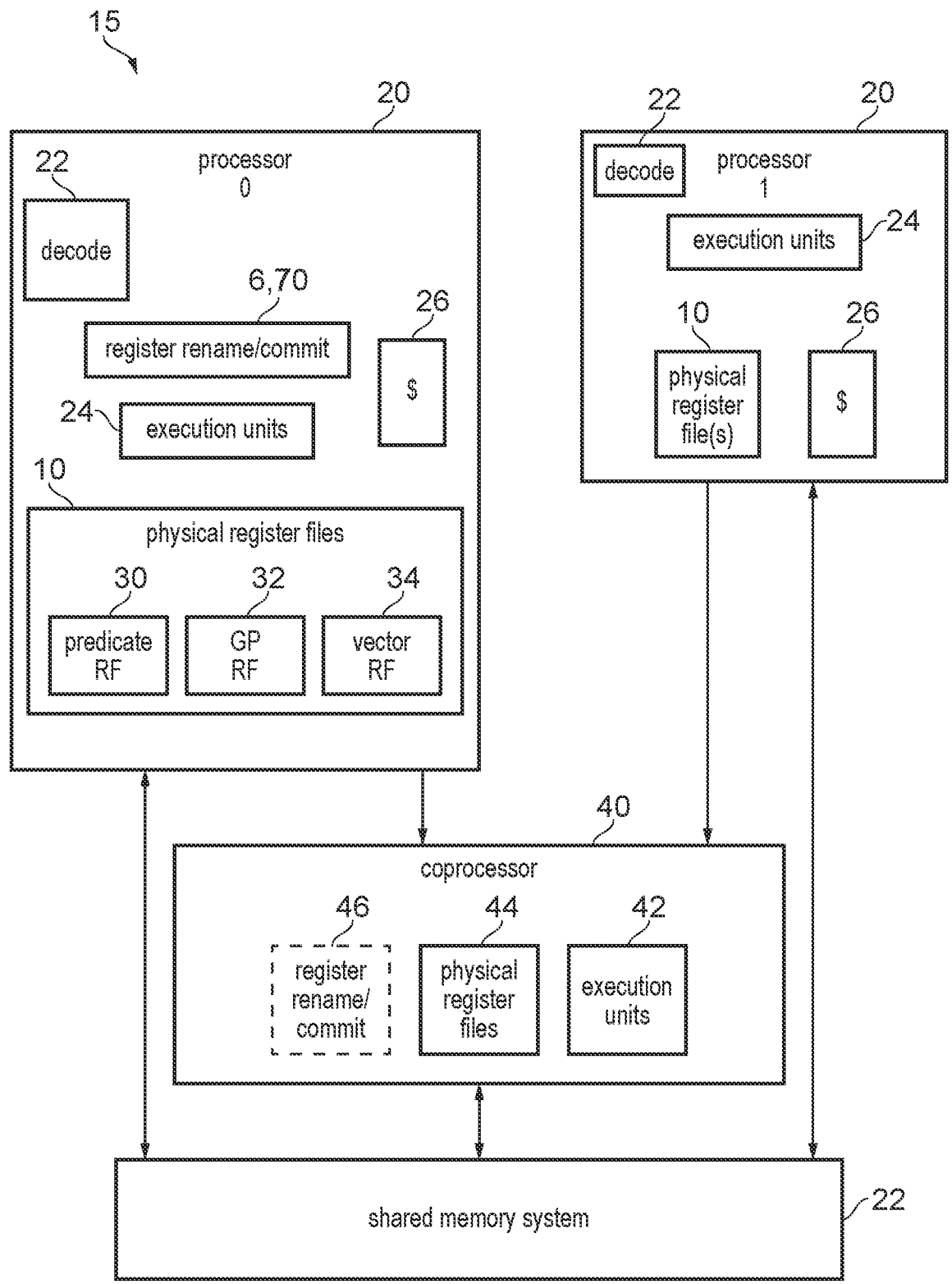
FIG. 2 illustrates a more detailed example of an apparatus comprising register rename circuitry.

FIG. 2 illustrates a more detailed example of a data processing apparatus 15 which can use the register mapping technique discussed here. The apparatus 15 has one or more processors 20 which share access to a shared memory system 22. FIG. 2 shows an example with two such processors 20, but it will be appreciated that there could be a different number of processors. The processors could be homogenous or heterogeneous—in the case of a heterogeneous multi-processing system, different processors may have different micro-architectural features. For example, each processor could be a CPU (Central processing unit), GPU (graphics processing unit), NPU (Neural processing unit—a processor specializing in operations for neural networks or other machine learning workloads), or other type of processor. Each processor may have instruction decoding circuitry 22 for decoding program instructions, one or more execution units 24 (an example of the processing circuitry 4 shown in FIG. 1) for executing different kinds of processing operations in response to the decoded instructions, one or more physical register files 10 providing hardware registers for storing operands for, and results of, processing operations executed by the execution units 24, and one or more caches 26 for caching data or instructions obtained from the memory system 22.

As shown in FIG. 2, at least one of the processors 20 has the register rename circuitry 6 described in FIG. 1, and also has register commit circuitry 70 (which will be described in more detail later). The processor 20 has, for its physical register files, a number of separate physically distinct physical register files 30, 32, 34, each comprising a certain number of hardware registers of a given physical register length (different register files may have different numbers of registers, and registers of different register length). For example, FIG. 2 shows an example where a processor 20 has a predicate register file 30 for storing predicate values for predicating vector operations or other SIMD operations, a general purpose register file 32 for storing scalar operands and results, and a vector register file 34 for storing vector operands or other SIMD (single-instruction-multiple data) operands and results for vector operations or other SIMD operations (e.g. as well as vector operands/results, another example of a SIMD operand/result may be a matrix comprising a two-dimensional array of matrix elements). The vector/SIMD operands and results comprise multiple independent data elements each representing an independent numeric value separate from other data elements of the operand/result. While in FIG. 2 only one of the processors is shown as having the register rename/commit circuitry 6, 70 and the specific physical register files 30, 32, 34 shown in FIG. 2, in other examples two or more of the processors may have these features.

The apparatus 15 also includes a coprocessor 40 (an external processing unit) which can be shared between processors 20 (or be dedicated for use by a specific processor 20) and has its own set of execution units 42 which are dedicated to performing a certain class of processing operations. The coprocessor 40 has its own physical register files 44 and may (optionally) have its own register mapping/reclaim circuitry 46, separate from the register mapping circuitry 6 provided in a given processor 20. By allowing a particular class of processing operations (e.g. vector, matrix or other SIMD processing operations) to be offloaded to the coprocessor 40 (when processing in a particular processing mode, e.g. the second mode of processing described earlier), this can free up bandwidth on the processor 20 for other operations, allow a more bespoke set of hardware to be used (which can support functions not available in the execution units 24 of the processor 20 and/or can more efficiently process that class operations compared to general purpose hardware in the processor 20 itself), and/or allow that bespoke hardware to be shared between processors 20 avoiding the need for duplicating that hardware at each individual processor 20.

Figure 3:
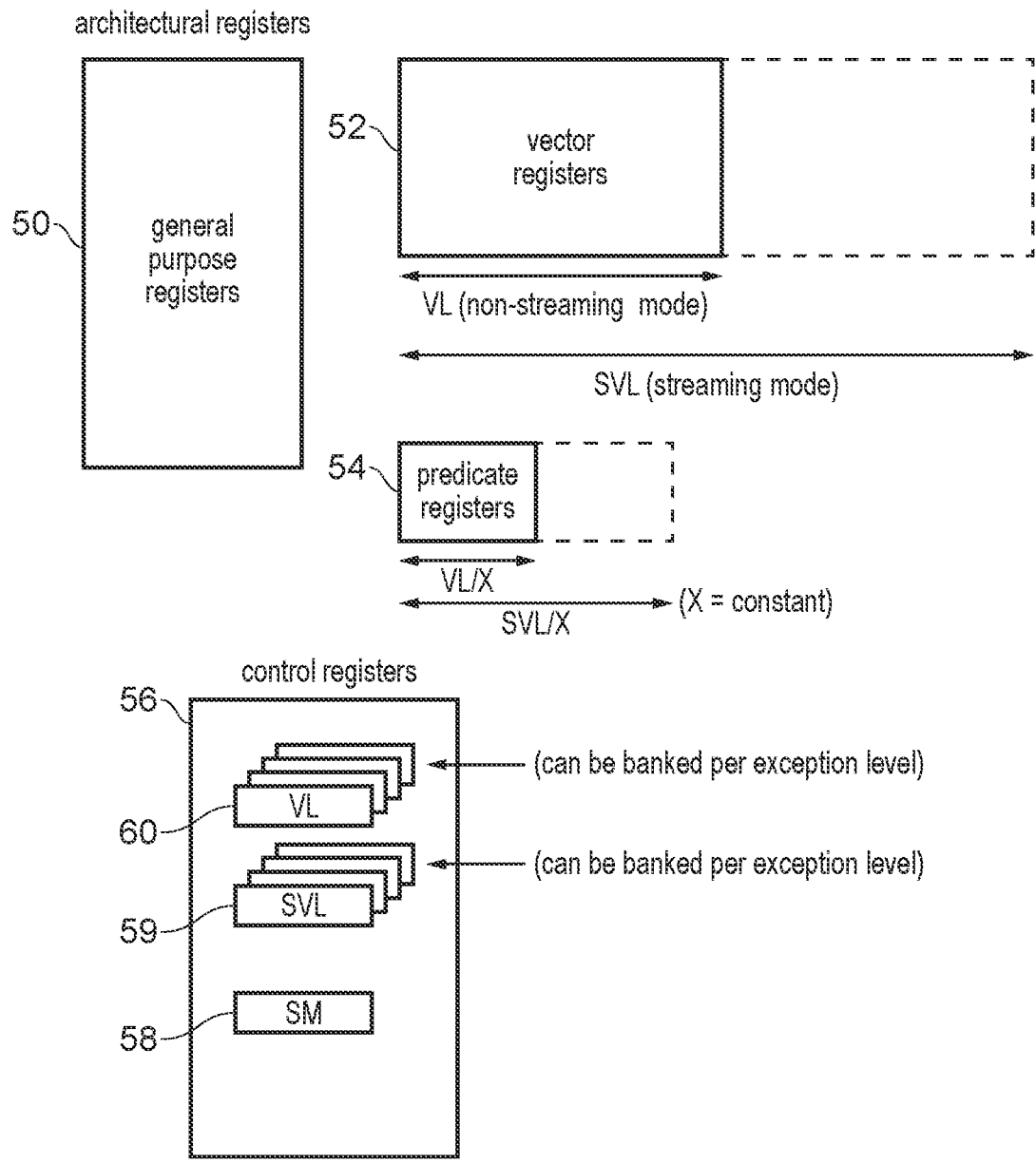
FIG. 3 illustrates sets of architectural registers and use of respective processing modes associated with different vector lengths.

FIG. 3 illustrates sets of architectural registers available for referencing by instructions encoded according to the instruction set architecture (ISA) supported by the processing system 15. FIG. 3 does not show the physical register files provided in hardware for implementing these architectural registers, but merely shows which registers are logically available for referencing by instructions. In this example, the ISA supports:

- a general purpose register set 50 (second set of architectural registers), comprising general purpose registers for specifying scalar operands for scalar processing operations;
- a vector register set 52 (third set of architectural registers), comprising vector registers for specifying vector operands for vector processing operations, matrix operations or other SIMD operations;
- a predicate register set 54 (first set of architectural registers), comprising predicate registers for specifying predicate values for predicating vector, matrix or other SIMD operations; and
- a set of control registers 56 for storing control values for controlling operation of the processor 20. Information stored in the control registers may be set automatically in response to certain events, or can be programmable based on execution of a system register updating instruction.

The ISA supported by the processing apparatus 15 is a scalable vector ISA (also known as a "vector length agnostic" vector ISA) supporting vector instructions operating on vectors of scalable vector length to enable the same instruction sequence to be executed on apparatuses with hardware supporting different maximum vector lengths. This allows different hardware designers of processor implementations to choose different maximum vector lengths depending on whether their design priority is high-performance or reduced circuit area and power consumption, while software developers need not tailor their software to a particular hardware platform as the software written according to the scalable vector ISA can be executed across any hardware platform supporting the scalable vector ISA, regardless of the particular maximum vector length supported by a particular hardware platform. Hence, the vector length to be used for a particular vector instruction of the scalable vector ISA (and hence also the predicate length of the corresponding predicate registers 54) is unknown at compile time (neither defined to be fixed in the ISA itself, nor specified by a parameter of the software itself). The operations performed in response to a given vector instruction of the scalable vector ISA may differ depending on the vector length chosen for a particular hardware implementation (e.g. hardware supporting a greater maximum vector length may process a greater number of vector elements for a given vector instruction than hardware supporting a smaller maximum vector length). An implementation with a shorter vector length may therefore require a greater number of loop iterations to carry out a particular function than an implementation with a longer vector length.

The vector length agnostic property of the scalable vector ISA is useful because within a fixed encoding space available for encoding instructions of the ISA, it is not feasible to create different instructions for every different vector length that may be demanded by processor designers, when considering the wide range of requirements scaling from relatively small energy-efficient microcontrollers to servers and other high-performance-computing systems. By not having a fixed vector length known at compile time, multiple markets can be addressed using the same ISA, without effort from software developers in tailoring code to each performance/power/area point.

To achieve the scalable property of the scalable vector ISA, the functionality of the vector instructions of the scalable vector ISA is defined in the architecture with reference to a parameter (e.g. VL 60 or SVL 59 as shown in FIG. 3, described in more detail below) which indicates the vector length in use (when considering the maximum vector length supported in hardware and any software-defined limitations using the control registers 56), where that parameter VL or SVL is unknown at compile time. Hence, execution of the same vector instruction on different systems may produce different results (typically varying in terms of the number of vector elements generated, a subset of which may have the same result values on different platforms, but platforms implementing a greater vector length may generate additional vector elements in comparison with a platform implementing a smaller vector length). Predicate values defined in the predicate registers 54 may be used to control which elements are generated in a given instance of an instruction and can be set based on vector length agnostic principles such as by using comparison instructions to automatically generate the values of predicate for a particular loop iteration or applying some generally-defined predicate pattern which can scale to different vector lengths. Certain instructions may update loop control parameters, such as an element count value, to track how many vector elements have been processed so far so that across all iterations of a loop as a whole both the implementations with wider and narrow vector lengths may eventually achieve the same results but with different levels of performance, since the implementation with a wider vector length may require fewer loop iterations than an implementation with a narrower vector length.

This particular ISA also supports two different modes for executing vector operations: a non-streaming mode of operation (first mode of operation) and a streaming mode of operation (second mode of operation). Mode indicating state information 58 stored in the control registers 56 indicates whether the current mode is the non-streaming mode or streaming mode, and can be set in response to execution of a mode changing instruction. Scalar operations using the general purpose registers 50 may be processed in the same way regardless of whether the current mode is the non-streaming mode or the streaming mode, but operations using the vector registers 52 and predicate registers 54 may be processed differently depending on whether the current mode is the streaming mode or the non-streaming mode.

In the non-streaming mode, vector registers 52 are architecturally designated as having a vector register length VL identified by a non-streaming vector length specifying value 60 specified in the control registers 56, and the predicate registers 54 are architecturally designated as having a register length VL/X, where X is a constant corresponding to a minimum vector element size supported (e.g. X may equal 8 for an implementation where the smallest vector element size is 8 bits). In the streaming mode, vector registers 52 are architecturally designated as having a streaming mode vector length SVL identified by a streaming vector length specifying value 59 specified in the control registers 56, and the predicate registers 54 are architecturally designated as having a register length SVL/X. Hence, both the vector registers 52 and predicate registers 54 may logically be seen as changing register length when there is a change of mode between the streaming mode and the non-streaming mode. The streaming and non-streaming modes are associated with different register lengths for the architectural vector registers 52 and predicate registers 54.

Both the non-streaming vector length specifying value 60 and streaming mode vector length specifying value 59 may be implemented in different ways. In some examples, these vector length specifying values 60, 59 could simply be a hardwired piece of state information which is not programmable by software, and simply indicates the maximum register length supported each mode by the hardware. This can then be read by software to identify the particular vector length implemented on the hardware executing the program, so that the same software can execute with different vector lengths on different hardware.

In other examples, the ISA may support more privileged software being able to limit the maximum vector length which is usable by software executing in a less privileged state. For example, to save power a given piece of software could be limited so that it cannot make use of the full vector length supported in hardware. Hence, the vector length specifying values 60, 59 could include information settable by software, to specify the vector length to be used in each mode 60, 59. Nevertheless, even if the more privileged software applies a limit on vector length, the vector length for the application software is still unknown at compile time because it will not be known whether the actual implemented vector length in a particular processor will be greater or less than the limit defined in the length specifying value 60, 59. For implementations with hardware supporting a smaller maximum vector length than the limit defined in the length specifying value 60, 59, a smaller vector length than indicated by the limit will actually be used. For example, the effective vector length seen by software may correspond to the minimum of the maximum vector length supported in hardware for the current mode and the vector length limit set by software. The vector length specifying values 60, 59 may be banked per exception level so that different limits on maximum vector length supported may be specified for software executing in different exception levels (e.g. software at one exception level may be allowed to use a longer vector length than software at another exception level).

Hence, there can be a variety of ways in which control state information stored in the control registers 56 may influence the vector length useful vector operations, but in general some state information is available which can enable software to determine the effective vector length used for each mode.

It can be useful to support both the non-streaming modes and streaming modes, as this can provide greater flexibility for hardware microarchitecture designers to introduce a coprocessor 40 as shown in FIG. 2, as the architecturally defined mode of processing and separate vector length indicating values 60, 59 for the respective modes makes it simpler for the hardware to determine when instructions requiring vector registers should be offloaded to the coprocessor 40 or executed within the local execution units 24 of a given processor 20. It also allows software to explicitly designate whether a particular workload would be more suited for execution on the general purpose execution units 24 of the processor 20 or on the more bespoke hardware of the coprocessor 40. This can be useful because for vector processing routines requiring smaller vectors and/or workloads where vector operations are interspersed with scalar operations, it may be more appropriate for the vector operations to be processed on the general purpose execution units 24 local to the processor 20 itself, while the coprocessor 40 may be more suited to processing "streaming" workloads which require high throughput of vector operations on large datasets with relatively little need for intervening scalar operations (e.g. workloads associated with machine learning applications such as neural network processing). To simplify micro-architecture implementation, a register clearing operation may be performed on a mode change between the streaming and non-streaming modes, to ensure that reads of the vector registers 52 and predicate registers 54 following a mode change between streaming/non-streaming modes return a predetermined value (e.g. zero) if they occur after the mode change without any intervening write to that register since the mode change. This avoids the need to transfer data between registers in the processor 20 and registers in the coprocessor 40 on the mode change, as the ISA specifies that software should assume that the architectural state in the vector registers 52 and predicate registers 54 are cleared on a mode change.

For such streaming workloads, longer vector lengths may be useful to reduce the instruction fetch/decode overhead associated with processing a given number of vector elements. Hence, although the ISA does not require it (the vector length for non-streaming mode may be selected from among a certain set of vector lengths supported, and the streaming mode vector length may be selected from among a second set of vector lengths supported, with no fixed relation between the length selected for non-streaming mode and streaming mode), in implementations which choose to provide a coprocessor 40 for supporting the streaming vector mode, it is relatively likely that the streaming mode vector length may be greater than the non-streaming mode vector length, in some cases many times greater. As just one example (other lengths can also be used), an implementation might choose to implement a maximum vector length of 128 bits in the non-streaming mode and 512 bits in the streaming mode, with the predicate registers therefore having an architectural vector length of 16 bits in the non-streaming mode and 64 bits in the streaming mode. When a coprocessor is provided, vector instructions executing the streaming mode would be expected to run on the coprocessor 40 which may have, within its physical register files 44, physical registers of sufficient size to handle the maximum streaming mode vector length. Therefore, there may be no need for the vector physical register file 34 in the processor 20 to expand beyond the maximum vector length supported for the non-streaming mode.

However, for the predicate register set 54, predicate computation operations may still need to be performed within the execution units 24 of the processor 20, even when the current mode is the streaming mode. Allowing the processor 20 to compute predicates for the streaming mode can sometimes be more efficient than using the coprocessor for predicate computations, because the predicate computation instructions may rely on scalar operands produced by scalar instructions executed on the execution units 24 of the processor 20. Either the predicate register file 30 of the processor 20 can be expanded to handle the streaming mode predicate length, or in some examples unused general purpose registers of the general purpose register file 32 could be mapped to the wider architectural predicate registers 54 used in the streaming mode.

In an implementation having a coprocessor 40 as in FIG. 2, in the first mode (non-streaming mode), the register rename circuitry 6 of the processor 20 may be responsible for allocating register mappings for each of the three sets of architectural registers (general purpose scalar registers 50, vector registers 52, and predicate registers 54), while in the second mode (streaming mode), the register rename circuitry 6 of the processor 20 may be responsible for allocating register mappings for only the general purpose scalar registers 50 and predicate registers 54 which may be referenced by instructions processed by the execution units 24 of the processor 20 during streaming mode. As vector/SIMD operations which reference the vector registers 52 are off-loaded to the coprocessor 40 during streaming mode, the register rename circuitry 6 in the processor 20 is not responsible for selecting register mappings for the architectural vector register set 52 during the streaming mode. For the vector registers 52, either the coprocessor 40 can have its own register rename/commit circuitry 46 for selecting and committing mappings between the architectural vector registers 52 and physical registers in the coprocessor's physical register files 44, or the coprocessor 40 may not have any rename circuitry at all (e.g. if the coprocessor 40 is an in-order unit which processes operations in program order, there may be no need for register renaming for the vector registers during the streaming mode).

Figure 4:
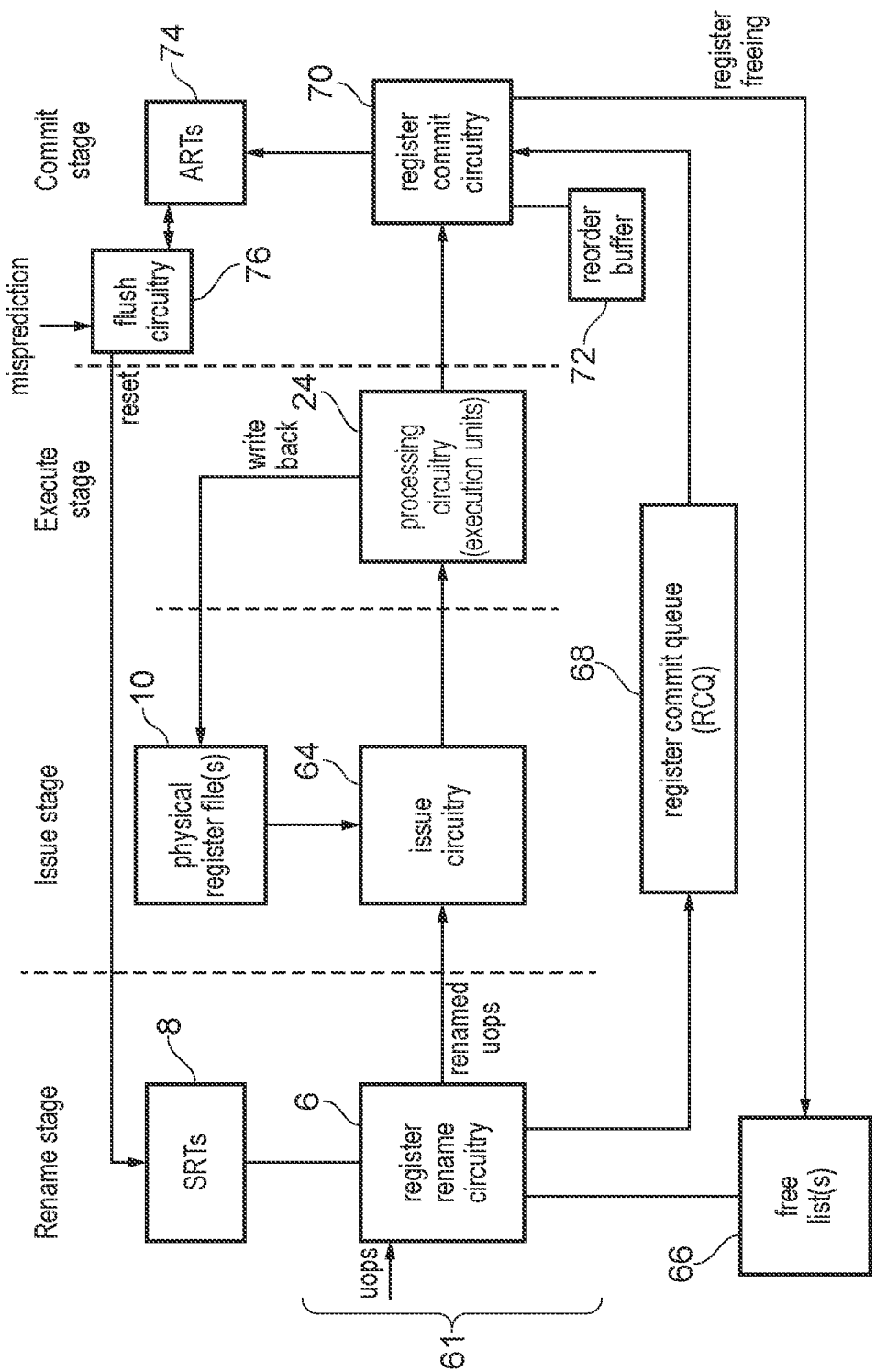
FIG. 4 illustrates an example of a processing pipeline comprising register rename circuitry and register commit circuitry.

FIG. 4 illustrates a portion of the processing pipeline 61 within the processor 20. FIG. 4 shows the pipeline 61 having a rename stage, issue stage, execute stage and commit stage. It will be appreciated that these are not the only stages of the processing pipeline 61. For example, prior to the rename stage, there may be a fetch stage for fetching program instructions from the cache 26, and a decode stage at which the instruction decoding circuitry 22 decodes the fetched instructions to generate micro-operations for processing in the pipeline stages shown in FIG. 4.

The register rename circuitry 6 is provided at the rename stage of the pipeline 61 for selecting register mappings for micro-operations received from the decode circuitry 22. The register rename circuitry 6 maintains one or more speculative rename tables (SRTs) 8 to track speculative register mappings between architectural registers and physical registers for micro-operations to be processed speculatively by the processing circuitry 24. The register rename circuitry 6 has access to one or more free register lists 66 which track which physical registers are available for reallocation to new architectural registers, and a register commit queue (RCQ) 68 which is a buffer maintaining a queue, arranged in program order, of architectural-to-physical register mappings allocated for respective micro-operations by the register rename circuitry 6. For a given micro-operation, any source architectural registers specified by the micro-operation are mapped to corresponding physical registers specified in corresponding rename entries of the SRTs 8, and any destination architectural register is mapped to a newly selected physical register selected from among those physical registers marked as available in the free list(s) 66, with the SRTs 8 being updated to track the newly selected architectural-to-physical register mapping for that destination architectural register. The new architectural-to-physical register mapping for that destination architectural register is also allocated to the RCQ 68 and the free list(s) is updated to mark the selected physical register as now being unavailable.

An indication of the renamed micro-operation (including any mapped physical register identifiers selected for the source and destination registers of the micro-operation) is passed to issue circuitry 64 at the issue stage of the pipeline, which controls reading of source operands from the physical register files 10 based on the physical register identifiers specified by the register rename circuitry 6 for the source architectural registers of the renamed micro-operation.

Once the source operands required for processing the micro-operation are available, the processing circuitry 24 at the execute stage of the pipeline 61 executes the processing operation represented by the micro-operation using the operands obtained by the issue circuitry 64, to generate a result which is written back to the physical register which was mapped to the destination architectural register of the micro-operation by the rename circuitry 6. At this point, the result is still speculative, as it may not yet be known whether the micro-operation should have been executed at all or whether the operands used for the operation are correct (e.g. an earlier branch prediction or data value prediction may not yet have been resolved).

A reorder buffer 72 at the commit stage is used to track out of order completion (execution) of micro-operations, and commitment of the micro-operations in program order. Any known technique can be used to maintain the reorder buffer (such reorder buffers are known in out of order processors). Based on the reorder buffer, the register commit circuitry 70 may identify a commit point of program flow up to which all older operations have been committed. The register commit circuitry 70 may use entries of the register commit queue 68 to identify corresponding architectural-to-physical register mappings associated with operations that have been committed in the reorder buffer 72. Those committed register mappings are used to update corresponding rename entries within a set of architectural rename tables (ARTs) 74 which track committed register mappings (as opposed to the speculatively allocated register mappings indicated in the SRTs 8). Based on the updates to the ARTs 74, the register commit circuitry 70 also controls freeing of physical registers which have been overwritten in the ARTs 74, to mark those freed physical registers as being available in the free list(s) 66 so that they can be made available for reallocation to different architectural registers at the rename stage.

The ART 74 are used by flush circuitry 76 to control resetting of the SRTs 8 in response to a flush event caused by a misprediction or other cause of incorrect speculation. If such a flush event is needed, the flush circuitry 76 may transfer the committed rename information from the ARTs 74 to the corresponding entries in the SRTs 8, and then use entries of the RCQ 68 to rebuild the SRTs 8 and hence restore register state to the point at which the misprediction occurred, so that subsequent operations can access register state as if the misprediction had not happened.

Figure 5:
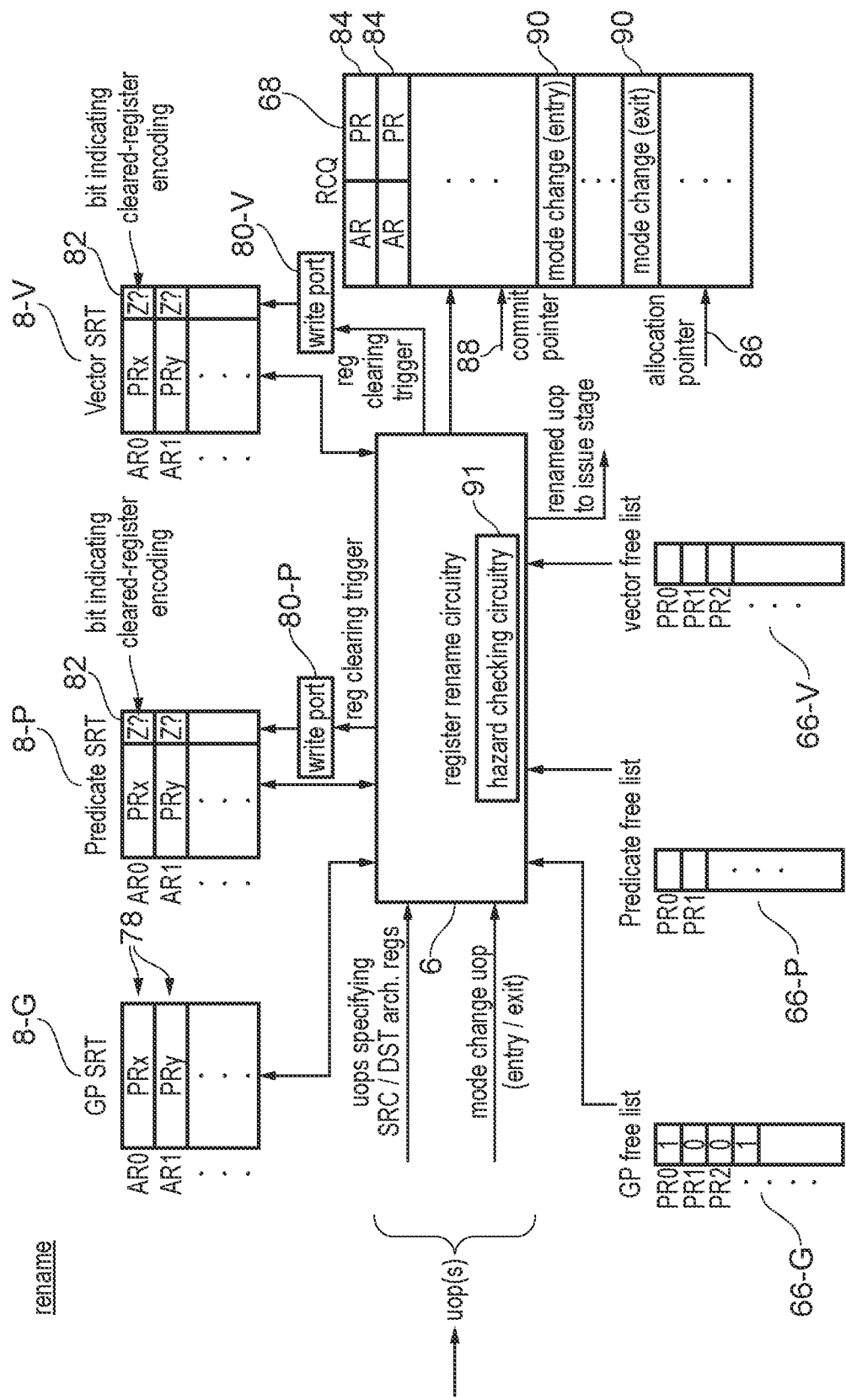
FIG. 5 illustrates an example of register rename circuitry supporting a cleared-register encoding for rename entries of at least one register rename table structure.

FIG. 5 illustrates in more detail the register rename circuitry 6 and rename structures used by the rename circuitry 6. The SRTs 8 include a general purpose SRT 8-G, a predicate SRT 8-P and a vector SRT 8-V for tracking speculative architectural-to-physical register mappings for the general purpose architectural registers 50, predicate registers 54 and vector registers 52 respectively. Each of the SRTs 8 comprises a set of rename entries 78, one per architectural register in the respective register sets. The rename entries 78 are indexed based on the architectural register identifier. Each rename entry 78 stores the physical register identifier identifying the physical register mapped to the associated architectural register.

For the rename entries 78 in the predicate SRT 8-P and the vector SRT 8-V (i.e. those sets of rename entries that correspond to sets of architectural registers to be logically cleared to a predetermined value in response to register clearing event such as the mode switch between streaming and non-streaming modes as discussed above), those rename entries 78 support a cleared-register encoding which indicates that the corresponding architectural register is treated as being logically cleared to a predetermined value (e.g. zero). In this example, the cleared-register encoding is implemented by providing a cleared-register bit 82 (or "zero" bit, Z, for the particular example where the predetermined value is zero), which indicates whether the entry has the cleared-register encoding. The predicate SRT 8-P has a write port 80-P which receives a register clearing trigger signal, and when the register clearing trigger signal is asserted, controls the cleared-register bits 82 of each of the rename entries in the predicate SRT 8-P to be set to the cleared-register encoding. Similarly, the vector SRT 8-P has a write port 80-V which receives a register clearing trigger signal, and when the register clearing trigger signal is asserted, controls the cleared-register bits 82 of each of the rename entries in the vector SRT 8-V to be set to the cleared-register encoding.

In this example, the general purpose SRT 8-G has rename entries 78 which do not support the cleared-register encoding because, for the particular implementation where the register clearing event is a streaming mode switch, there is no need to reset the general purpose registers to the predetermined value on the streaming mode switch.

The rename stage receives one or more micro-operations from the instruction decoding circuitry 22, which could include functional micro-operations (e.g. arithmetic or load/store micro-operations) specifying source and/or destination architectural registers, or a mode change micro-operation decoded by the instruction decoding circuitry 22 from a mode change instruction whose architectural function is switching the processing circuitry between the non-streaming mode and streaming mode.

For a functional micro-operation specifying a source architectural register in one of the architectural register sets 50, 54, 52, the register rename circuitry 6 reads out the physical register identifier currently mapped to that source architectural register from the one of the SRTs 8-G, 8-P, 8-V associated with the source architectural register, and provides that physical register mapping to the issue stage along with the renamed micro-operation.

For a functional micro-operation specifying a destination architectural register in a given one of the architectural register sets 50, 54, 52, in non-streaming mode, a free physical register is selected from the free list 66-G, 66-P, 66-V corresponding to the given one of the architectural register sets, the corresponding one of the SRTs 8-G, 8-P, 8-V is updated to write the identifier of the selected physical register to the rename entry 78 corresponding to the destination architectural register, and the corresponding free list 66-G, 66-P, 66-V is updated to mark the selected physical register as no longer being free. In the streaming mode, there should be no instructions referencing vector architectural registers as vector instructions are dispatched to the coprocessor 40, so the vector free list 66-V and vector SRT 8-V would be unused. In the streaming mode, the selection of free physical registers would be from the general purpose free list 66-G when generating a new register mapping for a destination general purpose register, and could be either from the predicate free list 66-P or the general purpose free list 66-G when generating a new register mapping for a destination predicate register, depending on whether predicate registers are mapped onto the predicate physical register file 30 or to general purpose registers of the general purpose physical register file 32 during the streaming mode as mentioned earlier.

For a mode change micro-operation received at the rename stage, the register rename circuitry 6 asserts the register clearing trigger signal to the write ports 80-P, 80-V of one or both of the predicate SRT 8-P and vector SRT 8-V, depending on whether the mode change is a streaming mode entry or streaming mode exit. In some examples the mode change micro-operation itself may distinguish whether the mode change is entry into the streaming mode (switch from non-streaming (first) mode to streaming (second) mode) or an exit from the streaming mode (switch from streaming mode to non-streaming mode). Alternatively, the mode change micro-operation may have the same encoding for both entry and exit, but the register rename circuitry 6 may toggle a stored "current mode" indication each time a mode change micro-operation is detected (with the current mode indication being reset to a predetermined state (e.g. indicating that the current mode is non-streaming mode) when the processor 20 is first powered up or encounters a reset event). The current mode indication can be used to determine, for a given mode change micro-operation, whether the current mode change is streaming mode entry or streaming mode exit. For streaming mode entry, the register rename circuitry 6 responds to the mode change micro-operation by asserting the register clearing trigger signals to the write ports 80-P, 80-V for both the predicate SRT 8-P and the vector SRT 8-V, so that the rename entries in both rename table structures are each set to the cleared-register encoding. On the other hand, for a streaming mode exit, the register rename circuitry 6 responds to the mode change micro-operation by asserting the register clearing trigger signal for the write port 80-P corresponding to the predicate SRT 8-P, but does not assert the register clearing trigger signal for the write port 80-V associated with the vector SRT 8-V. This recognises that, since the rename circuitry 6 is not responsible for maintaining register mappings for the vector register set 52 during streaming mode, there will have been no further vector rename updates to the vector SRT 8-V since streaming mode entry and so the rename entries 78 of the vector SRT 8-V will still be set to the cleared-register encoding and so do not require a further update on streaming mode exit. For both streaming mode entry and streaming mode exit, multiple rename entries 78 are set to the cleared-register encoding in response to a single micro-operation, so it is not necessary for the pipeline to generate multiple micro-operations corresponding to each individual architectural register required to be cleared to the predetermined value.

The register rename circuitry 6 also maintains the register commit queue (RCQ) 68 to provide a series of RCQ entries which associate updates to the speculative register mappings in the SRTs 8 with particular points of program flow. The RCQ 68 is managed as a circular buffer comprising a number of RCQ entries 84 each specifying at least an architectural register identifier (AR) of an architectural register and a physical register identifier (PR) identifying a corresponding physical register mapped to that architectural register by the rename circuitry 6. An allocation pointer 86 is used by the rename circuitry 6 to identify the position in the buffer at which the next RCQ entry should be inserted when a new register mapping is allocated by the rename circuitry 6. A commit pointer 88 is used by the register commit circuitry 70 (described later) to identify the position in the buffer corresponding to the next RCQ entry to be committed when a corresponding operation is committed. The allocation pointer 86 is advanced to the next entry each time a new entry is inserted to the buffer (and wraps round from the end of the buffer to the start of the buffer when the end of the buffer has been reached). Similarly, the commit pointer 88 is advanced each time an entry is committed (and wraps round from the end of the buffer to the start of the buffer when necessary). The entries of the RCQ 74 represent, in program order, the sequence of register mappings allocated by the register mapping circuitry 6, and are used by the register commit circuitry 70 to determine which physical registers can be freed for reallocation when speculative operations are committed, and to enable rebuilding of the SRTs 8 by the flush circuitry 76 following a flush event such as a misprediction.

As shown in FIG. 5, for a mode change micro-operation, the rename circuitry 6 allocates a mode change entry 90 to the RCQ 68 and then updates the allocation pointer 68 accordingly to move to the next queue entry. The mode change entry 90 has a different encoding to standard RCQ entries representing architectural-to-physical register mappings, and distinguishes whether the mode change is a streaming mode entry or a streaming mode exit. The mode change entry enables the register commit circuitry 70 at commit time to determine when corresponding register clearing actions are needed for the ARTs 74.

As shown in FIG. 5, the register rename circuitry 6 has hazard checking circuitry 91 for checking for read after write (RAW) hazards between micro-operations being renamed in parallel in the same processing cycle. Although some implementations could support renaming of only a single micro-operation per processing cycle, to increase bandwidth other implementations may support multiple micro-operations being renamed in parallel. If more than one micro-operation is being renamed in parallel, there is a risk that an older micro-operation may specify a destination register which is also used as a source register by a younger operation being renamed in the same cycle. Hence, the hazard checking circuitry 91 compares the source architectural registers specified by micro-operations against the destination architectural registers specified by any older micro-operation being renamed in the same cycle, and detects a hazard if the source architectural register of the younger micro-operation matches the destination architectural register of an older micro-operation renamed in the same cycle. If a hazard is detected, then this could be addressed either by stalling the younger micro-operation until a later rename cycle (so that the correct physical register updated in the SRT 8 for the older micro-operation in the current cycle can be read from the SRT 8 for the younger micro-operation in a following cycle), or by providing a forwarding path by which the physical register selected for the destination register of the older micro-operation can be forwarded to the younger micro-operation for mapping to the source architectural register of the younger micro-operation (even if that newly selected physical register has not yet been written to the corresponding rename entry 78 of the relevant SRT 8 associated with the destination architectural register of the older micro-operation).

To handle the mode change micro-operation, the hazard checking circuitry 91 can accept a "match all" input for the mode change micro-operation which indicates that a hazard should be detected between the mode change micro-operation and any younger micro-operation renamed in the same cycle which specifies one of the sets of architectural registers to be cleared in the register clearing event triggered by that mode switch (or in some cases, for simpler implementation, a hazard could be detected between the mode change micro-operation and any younger micro-operation renamed in the same cycle, regardless of checking which set of architectural registers is referenced by the younger micro-operation). Hence, a specific architectural register match is not required in order to detect a hazard between an older micro-operation and a younger micro-operation when the older operation is a mode change micro-operation. When a hazard is detected for the mode change micro-operation, the response to the hazard can be the same as if detecting a RAW hazard between standard functional micro-operations, e.g. either stalling the younger micro-operation or providing a forwarding path by which the selected mapping (in the case of the mode change micro-operation, a mapping indicating the cleared-register encoding is selected) is forwarded from the older micro-operation to the younger micro-operation.

Figure 6:
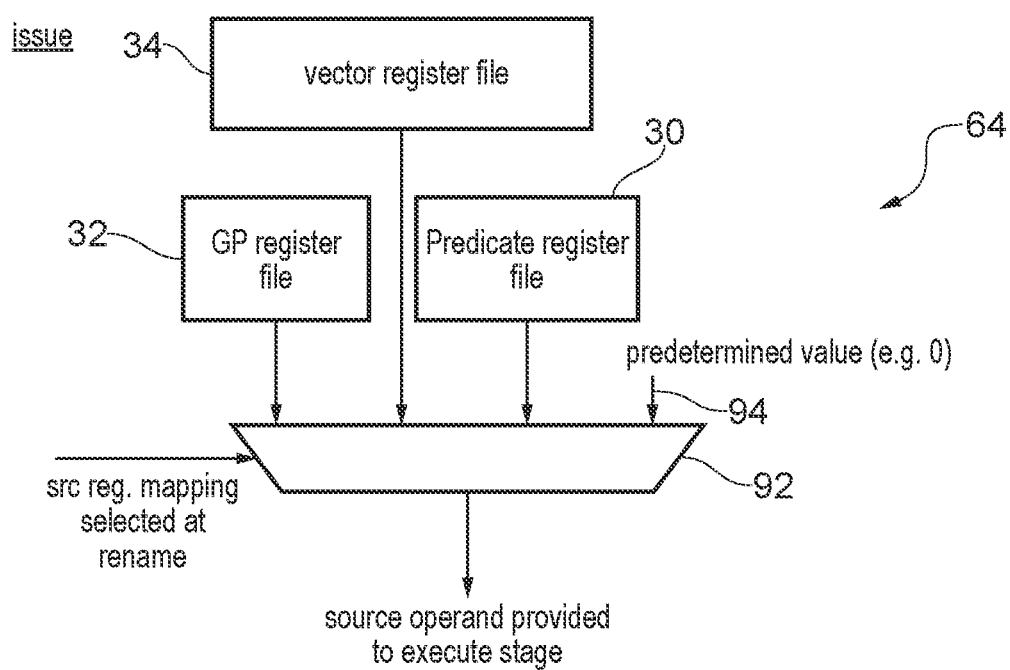
FIG. 6 illustrates issue circuitry to select a value for a source operand of an instruction based on whether a corresponding rename entry has been set to a cleared-register encoding.

FIG. 6 illustrates a portion of the issue circuitry 64 in more detail. The issue circuitry 64 includes multiplexing circuitry 92 for selecting, based on the source register mapping selected by the register rename circuitry 6, whether to obtain a source operand value for a micro-operation from the general purpose register file 32, vector register file 34 or predicate register file 30. The source register mapping also controls the selection of the specific physical register in the selected register file 30, 32, 34 from which the source operand is read (for conciseness, read ports and addressing logic for selecting a specific physical register from a given register file are not shown in FIG. 6). As shown in FIG. 6, the multiplexing circuitry 92 has a further input 94 which provides the predetermined value (e.g. a value having all bits set to 0). For a renamed micro-operation for which the rename circuitry 6 indicates that the source register mapping has the cleared-register encoding (as determined from the corresponding rename entry 78 in one of SRTs 8-P, 8-V), the multiplexing circuitry 92 selects the predetermined value and outputs that value as the source operand to be provided to the execute stage for processing, instead of obtaining the source operand from one of the physical register files 30, 32, 34. Hence, no register file read is needed when the rename mapping provided by the rename stage indicates the cleared-register encoding.

Figure 7:
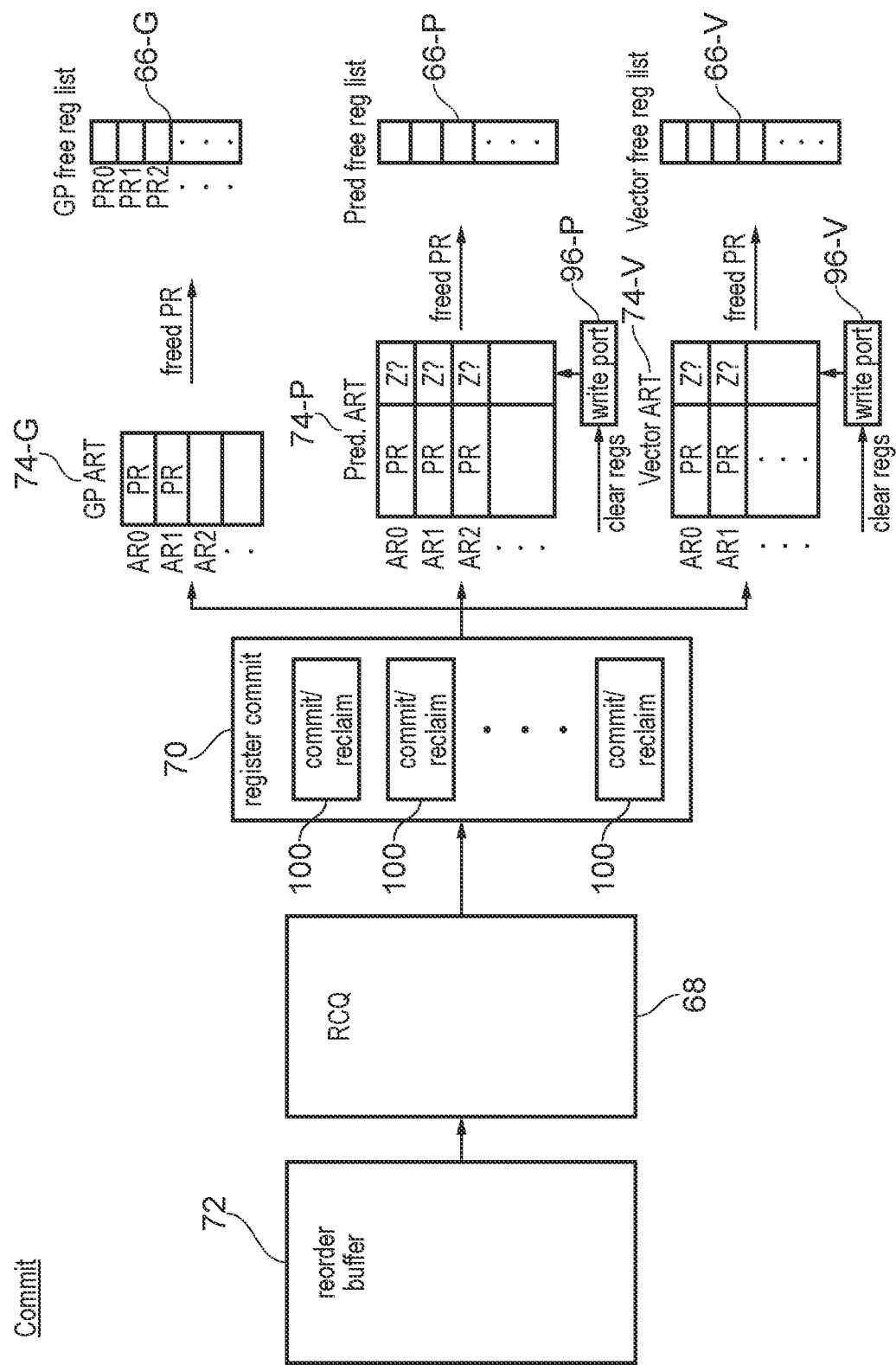
FIG. 7 illustrates an example of register commit circuitry.

FIG. 7 illustrates a portion of the register commit circuitry 70 in more detail. In a similar way to the SRTs 8, the ART 74 is implemented as separate table structures corresponding to the respective sets of architectural registers 50, 54, 52. The ART structures 74 comprise a general purpose ART 74-G, a predicate ART 74-P and a vector ART 74-V, which have similar formats to the corresponding speculative structures but track committed register mappings rather than speculative register mappings. Similar to the predicate SRT 8-P and vector SRT 8-V, the predicate ART 74-P and vector ART 74-V support the cleared-register encoding and have write ports 96-P, 96-V allowing each rename entry in the corresponding ART to be set to the cleared-register encoding in response to a single request signal being asserted.

The RCQ 68 and free register lists 66-G, 66-P, 66-V are the same structures as shown in FIG. 5 (unlike the rename tables, the apparatus does not comprise separate speculative and committed versions of the RCQ 68 and free register lists 66—instead both the rename circuitry 6 and commit circuitry 70 reference the same structures for the RCQ 68 and free register lists 66).

The reorder buffer 72 is used by the register commit circuitry 70 to track out of order execution, and in-order commitment of processing operations. The reorder buffer 72 has a number of entries, each corresponding to a given operation to be processed and specifying whether that operation has been executed yet. Entries are allocated to the reorder buffer 72 as the operations to be processed are generated by a front-end stage of the pipeline (e.g. a decode stage or the rename stage 6). The entries are arranged corresponding to the order in which the operations would logically appear if instructions of a corresponding program were executed in the original program order. However, the execution units 24 at the execute stage of the pipeline 61 are able to execute the operations out-of-order, in an order different from the program order, so that a younger operation whose operands are already available may bypass an older operation which is still waiting for operands, where the younger operation is independent of the older operation. Hence, when a given operation is executed, the corresponding entry in the reorder buffer 72 is updated to indicate that the operation has been executed. A given operation tracked by the reorder buffer 72 can be committed when it has been executed by the execute stage and there are no older operations still awaiting commitment. For example, a reorder buffer commit pointer may track the reorder buffer entry corresponding to the oldest remaining uncommitted operation which has not yet been executed. Once that operation is executed, the reorder buffer commit pointer may be advanced to the next oldest unexecuted entry and the operations corresponding to the entry previously pointed to by the reorder buffer commit pointer (and any intervening entries between that entry and the latest entry pointed to by the reorder buffer commit pointer) may be committed, causing register reclaim operations to be performed by the register commit circuitry 70 based on corresponding entries of the RCQ 68.

In some cases, a reorder buffer entry may be shared between a number of separate micro-operations executed by the execution units 24 (e.g. micro-operations handled by different execution units which correspond to the same program instruction), and if so then the reorder buffer entry is committed once all of those micro-operations have executed (the reorder buffer entry may track how many of the micro-operations have executed, to allow a determination of when the entry can be considered committed).

When a given entry of the reorder buffer 72 is committed, that entry specifies how many corresponding RCQ entries 84 were allocated to the RCQ 68 by the register mapping circuitry 6 when performing register renaming for the corresponding operation. For a functional micro-operation, the number of RCQ entries for the committed operation may correspond to the number of destination registers associated with that operation. Hence, the register commit circuitry 70 reads out the specified number of RCQ entries 84 from the RCQ 68 (from locations in the RCQ 74 determined relative to the RCQ commit pointer 88), and advances the RCQ commit pointer 88 corresponding to the read out number of RCQ entries, so that the RCQ commit pointer 88 now points to the next uncommitted RCQ entry. As shown in FIG. 7, the register commit circuitry 70 may have multiple commit/reclaim units 100 which operate in parallel, each to process a commit/reclaim operation for a corresponding RCQ entry committed in the same processing cycle.

When a given RCQ entry 84 corresponding to a functional micro-operation is committed, that entry identifies whether the entry relates to an architectural general purpose register, architectural predicate register or architectural vector register, and the corresponding commit/reclaim unit 100 allocated for that RCQ entry 84 looks up the architectural register specified in the committed RCQ entry in the relevant ART 74 related to that type of architectural register, obtains the physical register identifier specified as mapped to that architectural register in the ART 74 (this physical register identifier identifying a physical register being evicted from the ART), and updates the ART entry corresponding to the architectural register identifier specified by the committed RCQ entry, to indicate as the mapped physical register the physical register identified by the committed RCQ entry. Hence, the committed RCQ entry has effectively overwritten the corresponding entry of the ART 74, causing the speculative mapping assigned for the committed operation to become committed to state as part of the mappings represented in the ART 74. The commit/reclaim unit 100 may also update the relevant free register list 66 to mark, as being freed for reallocation, the evicted physical register which was previously specified in the ART entry corresponding to the committed architectural register. In some examples, there may be at least one other condition (as well as eviction of the physical register from the ART 76) that should be satisfied before the free register list 66 is updated to mark the evicted physical register as freed.

When the committed RCQ entry 84 is a mode change entry 90, the commit/reclaim unit 100 allocated for processing that mode change entry 90 asserts the register clearing trigger signal to both the write ports 96-P, 96-V if the mode change RCQ entry indicates streaming mode entry (switch from non-streaming mode to streaming mode), and asserts the register clearing trigger signal to the write port 96-P associated with the predicate ART 74-P (but not the write port 96-V for the vector ART 74-V) if the mode change RCQ entry indicates streaming mode exit (switch from streaming mode to non-streaming mode). Hence, for streaming mode entry all entries in both predicate/vector ARTs 74-P, 74-V are reset to the cleared-register encoding (e.g. by setting a "zero" bit Z), but for streaming mode exit only the rename entries in the predicate ART 74-P are set to the cleared-register encoding.

When a given ART entry in one of the predicate/vector ARTs 74-P, 74-V is set to the cleared-register encoding, this means that the physical register specified in that entry no longer represents committed architectural state (instead, the cleared-register encoding indicates that that architectural register is committed as having the predetermined value). Hence, one would expect that physical register to be freed in the free list 66-P, 66-V, to allow it to be reallocated for mapping to a different architectural register. As the register clearing event affects multiple architectural registers simultaneously, this means that in principle many physical registers can all be freed in response to the single mode change RCQ entry 90 being committed. However, in practice actually freeing all these physical registers would consume a lot of register reclaim bandwidth, which may be greater than the number of register freeing operations that can be supported in a single cycle and may occupy register reclaim bandwidth for many cycles. It may be undesirable to increase the bandwidth available for reclaim merely to handle freeing of physical registers associated with ART entries set to the cleared-register encoding. Therefore, the register commit circuitry 70 does not immediately free the physical registers specified in the ART entry set to the cleared-register encoding, but instead waits for the next normal RCQ entry (allocated to the RCQ entry in response to a functional micro-operation at the rename stage) to be committed which indicates a mapping for the architectural register whose rename entry in the ART is set to the cleared-register encoding, and then frees the corresponding physical register at the time when the "Z" bit is cleared and the physical register field is overwritten with the committed physical register specified by that next normal RCQ entry. This allows peak reclaim bandwidth to be reduced, allowing more efficient circuit implementation.

Figure 8:
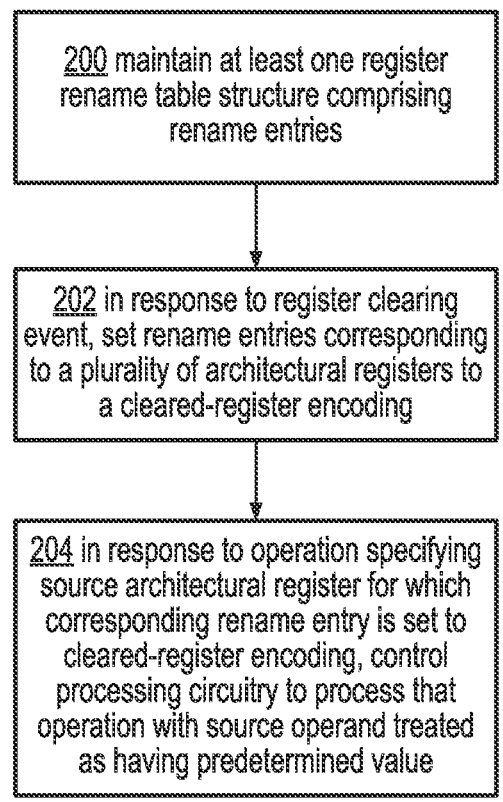
FIG. 8 illustrates a method including a step of responding to a register clearing event by setting rename entries of a rename table structure to a cleared-register encoding.

FIG. 8 illustrates a method of performing register renaming and responding to a register clearing event. At step 200, the register rename circuitry 6 maintains at least one register rename table structure 8 comprising rename entries 78. At step 202, in response to a register clearing event, the register rename circuitry 6 sets rename entries 78 corresponding to a plurality of architectural registers to a cleared-register encoding. At step 204, in response to an operation specifying a source architectural register for which the corresponding rename entry 78 is set to the cleared-register encoding, the register rename circuitry 6 controls the processing circuitry 24 to process that operation with the source operand treated as having a predetermined value.

Figure 9:
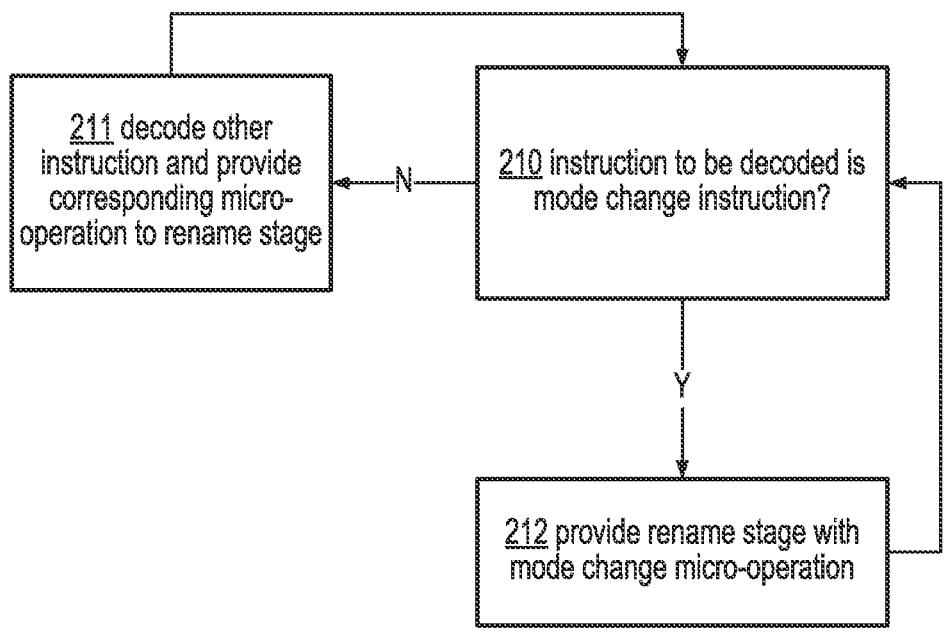
FIG. 9 illustrates steps for decoding a mode change instruction.

FIG. 9 illustrates decoding of instructions by the instruction decoding circuitry 22. At step 210, the instruction decoding circuitry 22 detects whether the next instruction to be decoded is the mode change instruction. If not, then at step 211, the instruction decoding circuitry decodes another type of instruction and provides at least one corresponding micro-operation to the rename stage of the processing pipeline 61 (some instructions may be decoded into multiple micro-operations). If the instruction to be decoded is the mode change instruction, then at step 212, the instruction decoding circuitry 22 provides the mode change micro-operation to the rename stage.

Figure 10:
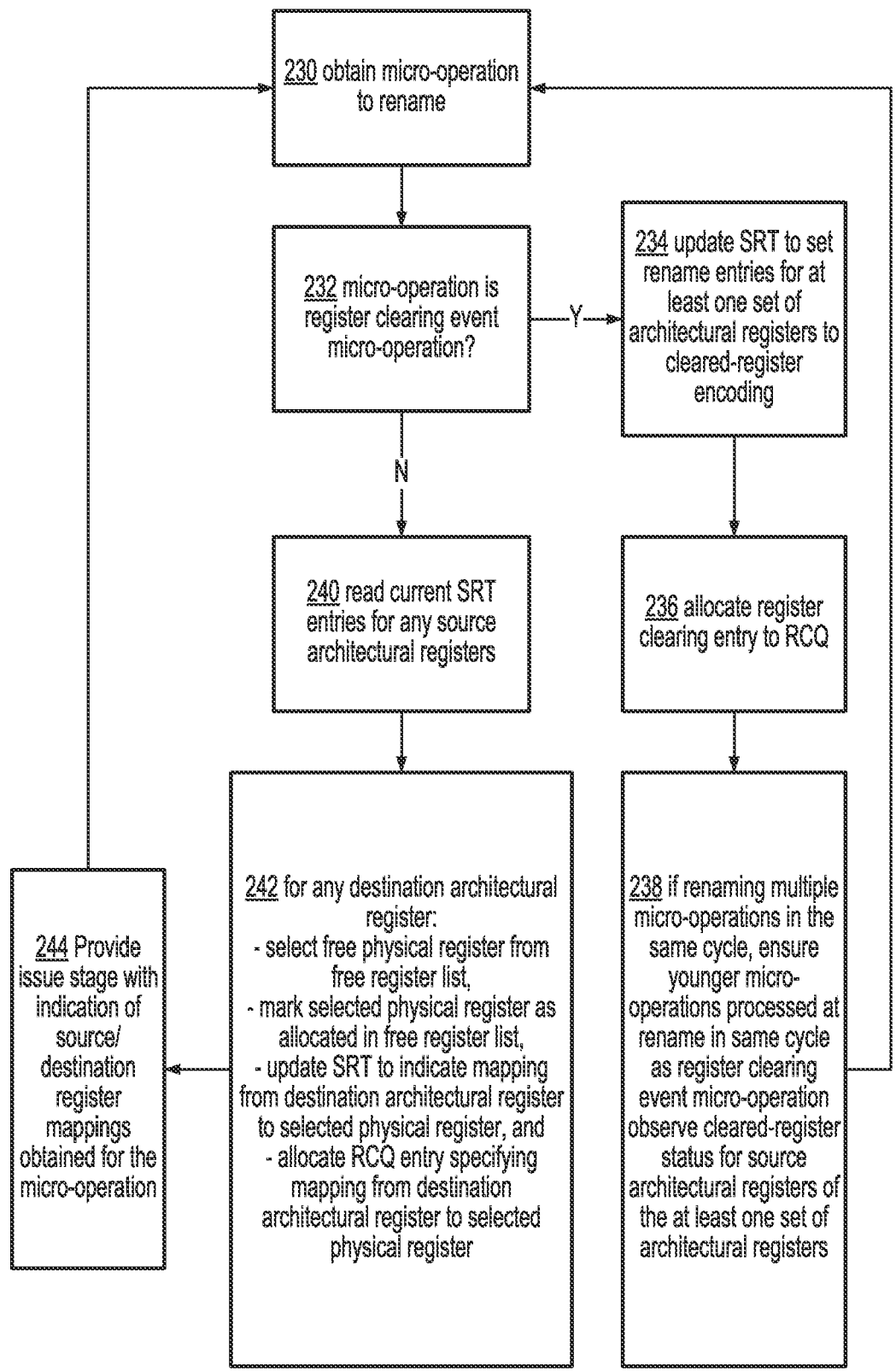
FIG. 10 illustrates steps performed by register rename circuitry for controlling register renaming.

FIG. 10 illustrates renaming of micro-operations by the register rename circuitry 6 at the rename stage of the processing pipeline 61. At step 230 the register rename circuitry 6 obtains a next micro-operation to be renamed. At step 232, the register rename circuitry 6 determines whether the micro-operation to be renamed is a register clearing event micro-operation (e.g. the mode change micro-operation generated by the instruction decoding circuitry 22 as in FIG. 9). If so, then at step 234, the register rename circuitry 6 updates the SRT 8 to set rename entries 78 for at least one set of architectural registers (e.g. one or both of the vector registers 52 and the predicate registers 54) to the cleared-register encoding. At step 236, a register clearing RCQ entry is allocated to the RCQ 68. For example, the register clearing RCQ entry may be the mode change entry 90 shown in FIG. 5. At step 238, if multiple micro-operations are being renamed in the same cycle, the register rename circuitry 6 takes action to ensure that any younger micro-operation processed at the rename stage in the same cycle as the register clearing event micro-operation observes the cleared register status for the source architectural registers of the at least one set of architectural registers. For example, the hazard checking circuitry 91 could stall younger micro-operations for at least one cycle, to allow them to read the updated rename entries having the cleared-register encoding from the SRT 8 (the updated information written to the SRT 8 at step 234 may not be readable from the SRT 8 until the following cycle). Alternatively, the hazard checking circuitry 91 could provide a forwarding path by which an indication of the cleared-register encoding may be forwarded from the register clearing event micro-operation to a younger micro-operation renamed the same cycle which references one of the at least one set of architectural registers.

On the other hand, if at step 232, the micro-operation being renamed is not a register clearing event micro-operation, then at step 240 the register rename circuitry 6 reads current SRT entries 78 for any source architectural registers of the micro-operation. At step 242, for any destination architectural register, the register rename circuitry 6: selects a free physical register from the relevant free register list 66, marks the selected physical register as allocated in the free register list 66, updates the relevant SRT 8 to indicate the mapping from the destination architectural register to the selected physical register, and allocates an RCQ entry 84 specifying the mapping from the destination architectural register to the selected physical register to the RCQ 68. If the SRT entry 78 updated with the mapping from the destination architectural register to the selected physical register was previously in the cleared-register encoding, the SRT entry 78 is set to an encoding other than the cleared-register encoding (e.g. the "Z" bit 82 is cleared). At step 244, the register rename circuitry 6 provides the issue stage of the pipeline 61 with an indication of the source and destination register mappings obtained for the micro-operation.

Figure 11:
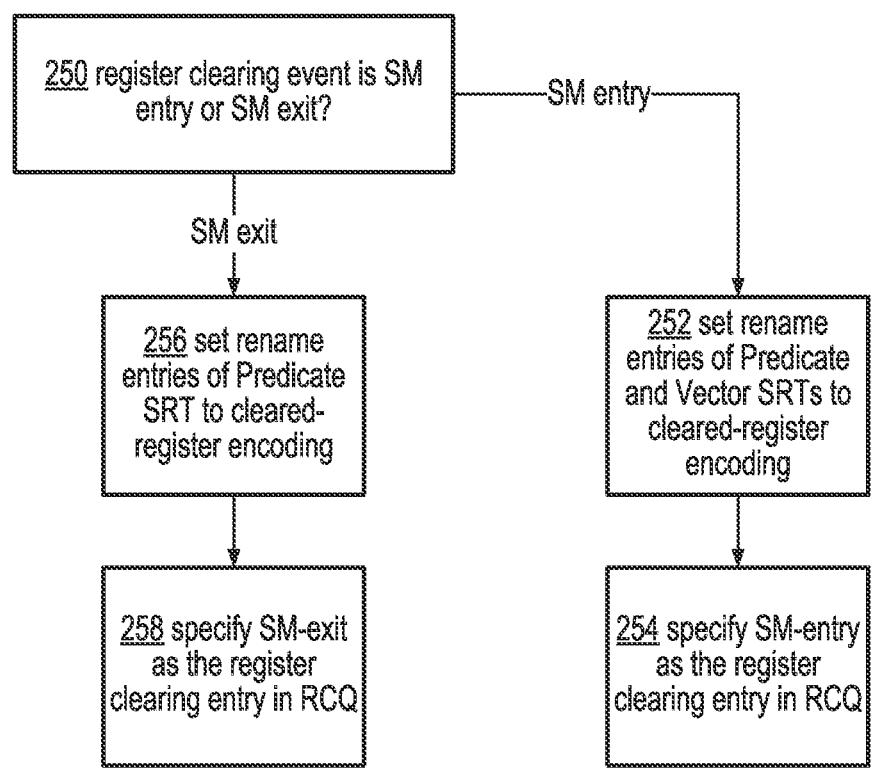
FIG. 11 illustrates in more detail setting of rename entries of at least one speculative rename table structure to the cleared-register encoding by the register rename circuitry.

FIG. 11 illustrates more detail for steps 234 and 236 of FIG. 10, in a particular example where different sets of architectural registers are cleared for different types of register clearing event. At step 250, the register rename circuitry 6 determines whether the register clearing event is a streaming mode entry event (switch from non-streaming mode to streaming mode) or a streaming mode exit event (switch from streaming mode to non-streaming mode). If the register clearing event is streaming mode entry, then at step 252 the rename entries 78 of the predicate SRT 8-P and the vector SRT 8-V are set to the cleared-register encoding, and at step 254 the mode change entry 90 allocated into the RCQ 68 specifies that the mode change is a streaming mode entry event. On the other hand, if the register clearing event is streaming mode exit, then at step 256 the rename entries 78 of the predicate SRT 8-P (but not the vector SRT 8-V) are set to the cleared-register encoding, and at step 258 the mode change entry 90 allocated into the RCQ 68 specifies that the mode change is a streaming mode exit event. For example, a bit in the mode change RCQ entry 90 may distinguish whether it relates to streaming mode entry or streaming mode exit.

Figure 12:
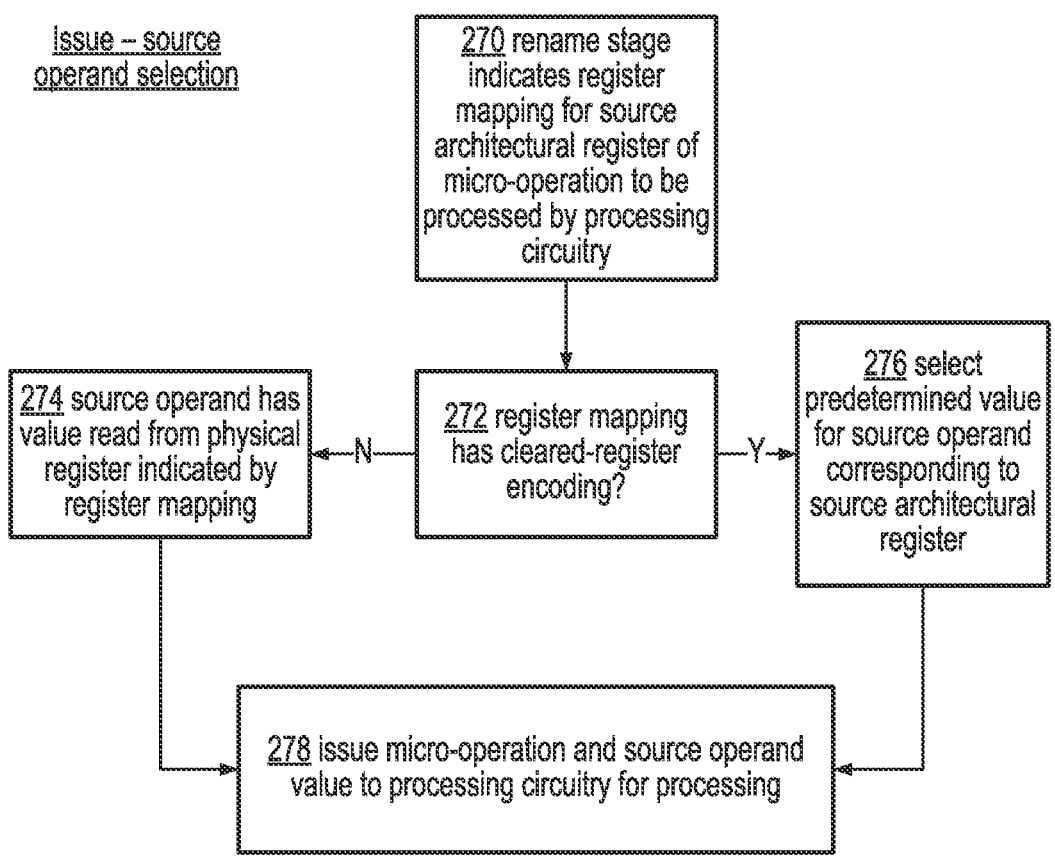
FIG. 12 illustrates steps performed by issue circuitry to select a source operand value.

FIG. 12 illustrates steps performed by the issue circuitry 64 to select a source operand value for a micro-operation. It will be appreciated that some micro-operations may have more than one source operand and in that case the steps shown in FIG. 12 are performed for each source operand. At step 270, the issue circuitry receives from the rename stage of the pipeline the register mapping for a source architectural register of a micro-operation to be processed by the processing circuitry. At step 272 the issue circuitry 64 determines whether the register mapping for that source architectural register has the cleared-register encoding. If the register mapping does not have the cleared-register encoding, then at step 274 the issue circuitry 64 controls a read port for one of the physical register files 30, 32, 34 to read a source operand from the physical register indicated by the register mapping as mapped to the source architectural register of the micro-operation. If the register mapping does have the cleared-register encoding, then at step 276 the issue circuitry 64 selects the predetermined value (e.g. zero) for the source operand correspond to the source architectural register, without needing to read a physical register for one of the register files 30, 32, 34. At step 278 the micro-operation is issued for processing by processing circuitry 24 along with its source operand value as selected at steps 272, 274, 276.

Figure 13:
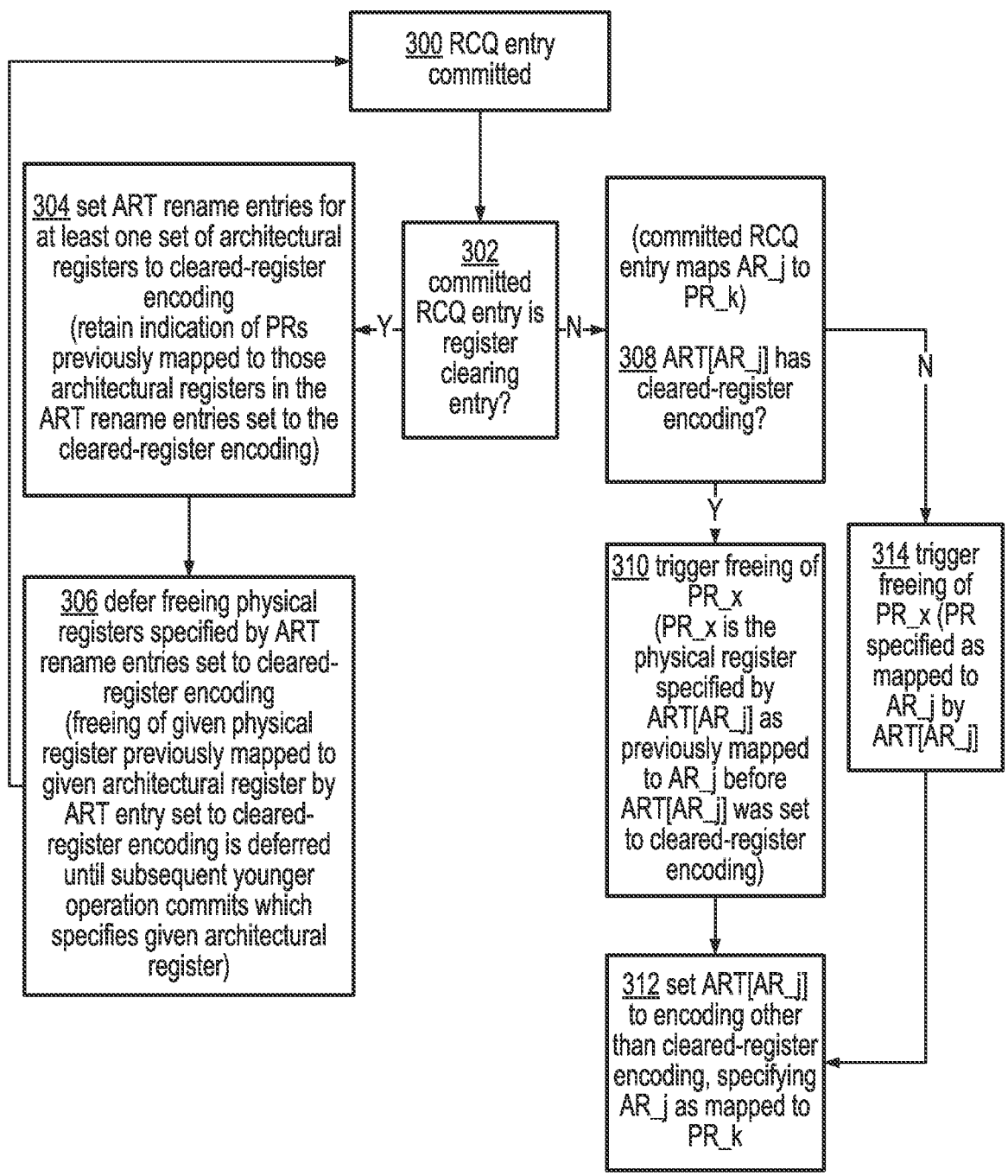
FIG. 13 illustrates steps performed by register commit circuitry for controlling commitment of register mappings and freeing of physical registers.

FIG. 13 illustrates steps performed by the register commit circuitry 70. At step 300, the register commit circuitry 70 detects, based on the reorder buffer 72, that a given RCQ entry 84 in the RCQ entry 68 is to be committed. The given RCQ entry 84 is read out from the RCQ and the commit pointer 88 is updated to point to the next RCQ entry in the queue.

At step 302, the register commit circuitry 70 determines whether the committed RCQ entry is a register clearing entry (e.g. the mode change entry 90 shown in FIG. 5). If the committed RCQ entry is a register clearing entry, then at step 304 the register commit circuitry sets the rename entries of the ARTs 74-P, 74-V for at least one set of architectural registers to the cleared register encoding. Although this indicates that the corresponding architectural registers are no longer mapped to any particular physical register in the committed register mappings, the indications of the physical registers previously mapped to those architectural registers are retained in the ART rename entries which were set to the cleared-register encoding. At step 306, the register commit circuitry 70 defers freeing the physical registers specified by the ART rename entries set the cleared-register encoding, as freeing of a given physical register previously mapped to a given architectural register by an ART entry set to the cleared-register encoding can be deferred until a subsequent younger operation commits which specifies the given architectural register.

On the other hand, if the committed RCQ entry is not a register clearing entry (that committed RCQ entry specifying a mapping between architectural register AR_j and physical register PR_k), then at step 308 the register commit circuitry 70 determines whether the ART rename entry corresponding to architectural register AR_j has the cleared-register encoding. If so, then at step 310 the register commit circuitry 70 triggers freeing of the physical register PR_x (which was previously mapped to AR_j before the ART rename entry corresponding to architectural register AR_j was set to the cleared-register encoding). While the register commit circuitry 70 may trigger a freeing process for the physical register PR_x at this time (which when complete will result in physical register PR_x being marked as available in the relevant free list 66), in some cases freeing of physical register may also depend on one or more other conditions and so the actual update to be free list 66 may not be performed immediately upon commitment of the RCQ entry mapping AR_j to PR_k, but could take place once those other conditions are also satisfied. At step 312, the entry of the ART 74 corresponding to architectural register AR_j is set to an encoding other than the cleared-register encoding, to specify that AR_j is now mapped to PR_k in the committed register mapping. For example, the physical register field of that ART entry can be set to the physical register identifier of register PR_k and the "Z" bit of that ART entry can be cleared. On the other hand, if at step 308 it is determined that entry ART [AR_j] does not have the cleared-register encoding, then at step 314 the register commit circuitry 70 triggers freeing of physical register PR_x (which was specified as mapped to architectural register AR_j by the ART entry corresponding to AR_j)—in that case the ART entry will already have an encoding other than the cleared-register encoding (although the physical register field of that ART entry is still updated from PR_x to PR_k).

Figure 14:
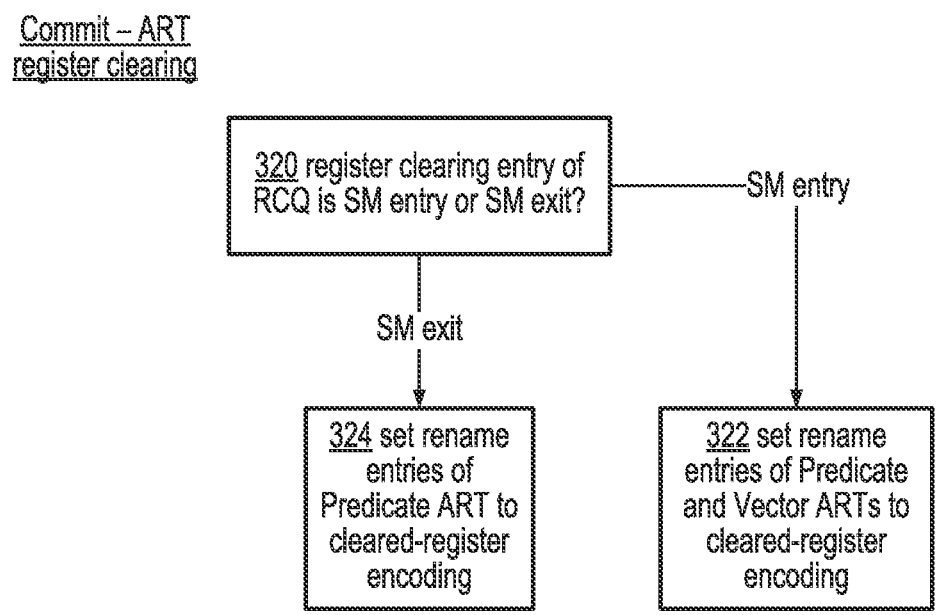
FIG. 14 illustrates in more detail setting of rename entries of at least one architectural rename table structure to the cleared-register encoding by the register rename circuitry.

FIG. 14 illustrates in more detail step 304 of FIG. 13. At step 320, the register commit circuitry 70 determines whether the register clearing entry 90 committed in the RCQ 68 indicates a streaming mode entry event (switch from non-streaming mode to streaming mode) or a streaming mode exit event (switch from streaming mode to non-streaming mode). If the register clearing event is streaming mode entry, then at step 322 the rename entries of the predicate ART 74-P and the vector ART 74-V are set to the cleared-register encoding. If the register clearing event is streaming mode exit, then at step 324 the rename entries of the predicate ART 74-P (but not the vector ART 74-V) are set to the cleared-register encoding.

Figure 15:
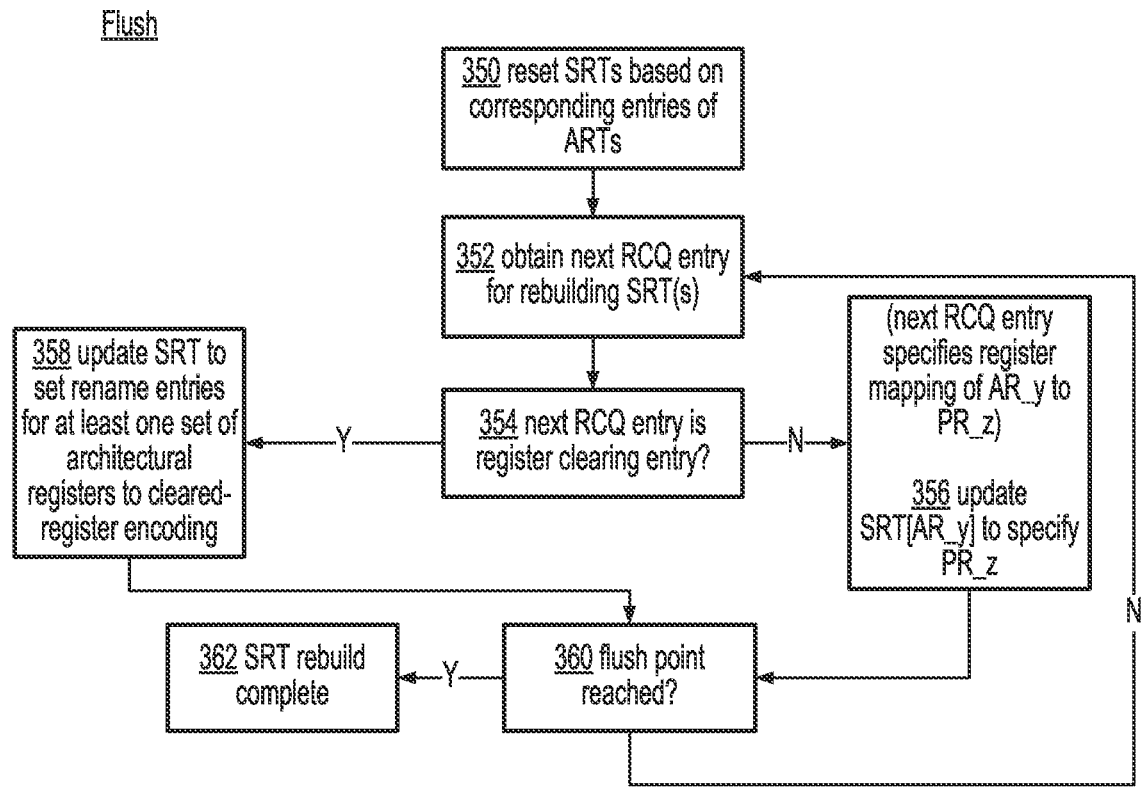
FIG. 15 illustrates steps performed by flush circuitry for controlling flushing of operations and corresponding register mappings following a misspeculation.

FIG. 15 illustrates steps performed by flush circuitry 76 in response to a flush event when operations are to be flushed from the pipeline so that processing can resume from an earlier point of program flow. For example, the flush event may be triggered by detection of a misprediction, such as a branch misprediction or incorrect data value prediction. At step 350, the flush circuitry resets the SRTs 8 based on corresponding entries of the ARTs 74 indicating the committed register mappings (which will not be affected by the misprediction as a micro-operation is not committed until any prediction affecting the micro-operation has been resolved as correct). That is, the register mappings indicated as committed in the ARTs 74 are copied to the corresponding rename entries of the SRTs 8. This has the effect of resetting architectural state to a previous version that was valid at the commit point (the point of program flow corresponding to the youngest committed operation).

However, the flush point where the misprediction occurred may be younger than the commit point and it may be desirable to avoid having to re-execute operations which are between the commit point and the flush point in program order and so are not affected by the misprediction. Therefore, the flush circuitry 76 can use the RCQ 68 to rebuild the SRTs 8 using register mappings selected for operations in program order between the commit point and the flush point. At step 352, the flush circuitry 76 uses the RCQ commit pointer 88 to identify the next RCQ entry for rebuilding the SRTs 8. At step 354, the flush circuitry 76 determines whether the next RCQ entry is a register clearing entry (e.g. the mode change entry 90 described earlier). If not, then the next RCQ entry will specify a register mapping from an architectural register AR_y to a physical register PR_z, and at step 356 the flush circuitry 76 updates the rename entry 78 of the relevant SRT 8 corresponding to architectural register AR_y to specify physical register PR_z as being mapped to architectural register AR_y (and ensures that rename entry 78 is not set to the cleared-register encoding, e.g. by clearing the "Z" bit 82 if currently set). On the other hand, if the next RCQ entry obtained at step 352 is a register clearing entry, then at step 358 the flush circuitry 76 updates the SRTs 8-P, 8-V to set rename entries for at least one set of architectural registers (e.g. the vector registers 52 and predicate registers 54) to the cleared-register encoding. Regardless of whether or not the next RCQ entry was a register clearing entry, at step 360 the flush circuitry 76 determines whether the flush point of program flow has been reached, and if not returns to step 352 to obtain the next RCQ entry 352 in the RCQ 68 in the rebuild process. If the flush point has been reached, then at step 362 the flush circuitry 76 determines that the SRT rebuild is complete.

Figure 16:
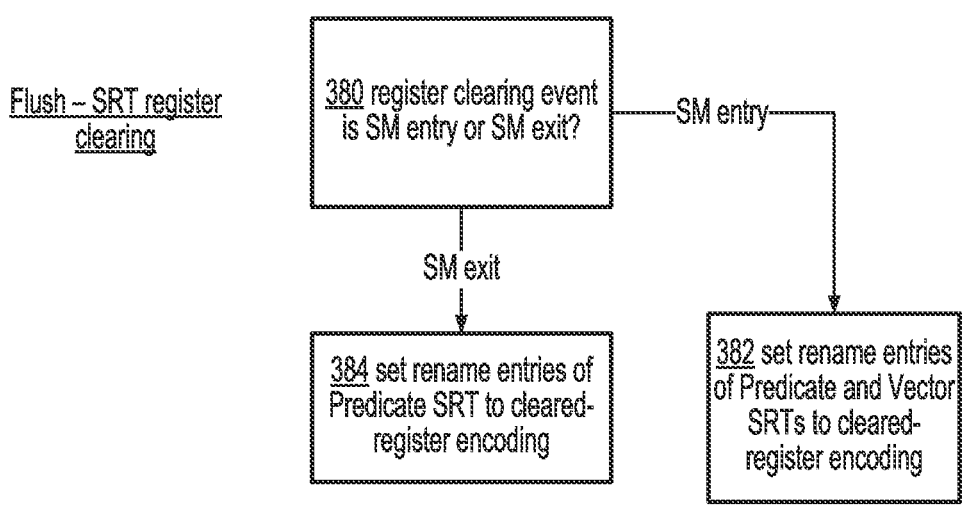
FIG. 16 illustrates in more detail setting of rename entries of at least one speculative rename table structure to the cleared-register encoding by the flush circuitry.

FIG. 16 illustrates in more detail step 358 of FIG. 15. At step 380, the flush circuitry 76 determines whether the register clearing entry identified as the next RCQ entry indicates a streaming mode entry event (switch from non-streaming mode to streaming mode) or a streaming mode exit event (switch from streaming mode to non-streaming mode). If the register clearing event is streaming mode entry, then at step 382 the rename entries of the predicate SRT 8-P and the vector SRT 8-V are set to the cleared-register encoding. If the register clearing event is streaming mode exit, then at step 384 the rename entries of the predicate SRT 8-P (but not the vector SRT 8-V) are set to the cleared-register encoding.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 17:
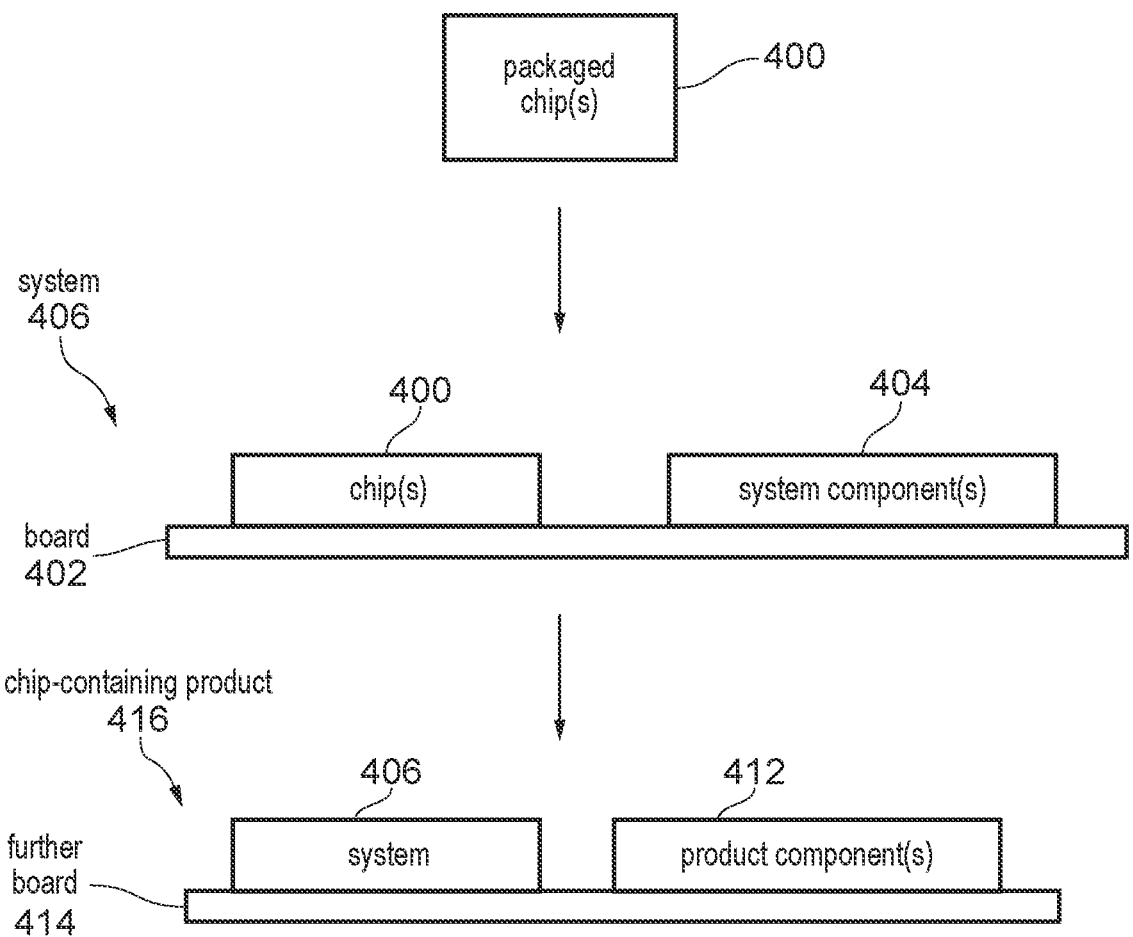
FIG. 17 illustrates a system and a chip-containing product.

As shown in FIG. 17, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (e.g. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
  at least one register rename table structure comprising rename entries for indicating register mappings between architectural registers specified by operations to be processed by processing circuitry and corresponding physical registers provided in hardware; and
  register rename circuitry to update the register mappings indicated by the rename entries of the at least one register rename table structure; in which:
  rename entries corresponding to at least one set of architectural registers support a cleared-register encoding;
  in response to an operation specifying a source architectural register for which a corresponding rename entry is set to the cleared-register encoding, the register rename circuitry is configured to control the processing circuitry to process that operation with a source operand corresponding to the source architectural register being treated as having a predetermined value; and
  in response to detection of a register clearing event indicating that at least one set of architectural registers is to be treated as having been cleared to the predetermined value, the register rename circuitry is configured to set a plurality of rename entries of the at least one register rename table to the cleared-register encoding, the plurality of rename entries corresponding to architectural registers in said at least one set of architectural registers.

2. The apparatus according to clause 1, in which the register rename circuitry is configured to set the plurality of rename entries to the cleared-register encoding in response to a single micro-operation representing the register clearing event.

3. The apparatus according to any of clauses 1 and 2, in which the rename entries corresponding to the at least one set of architectural registers each comprise a cleared-register bit, and the cleared-register encoding comprises an encoding in which the cleared-register bit is set to a predetermined value.

4. The apparatus according to clause 3, in which the at least one register rename table structure has at least one write port configured to control setting of the cleared-register bits in two or more of the plurality of rename entries in response to a single trigger signal input to the at least one write port.

5. The apparatus according to any of clauses 1 to 4, in which:
  the at least one register rename table structure comprises at least one speculative register rename table structure comprising rename entries for indicating speculative register mappings for speculatively processed operations; and
  the apparatus comprises register commit circuitry to maintain, in response to commitment of operations processed by the processing circuitry, at least one architectural rename table structure comprising rename entries for indicating committed register mappings associated with a commit point of program flow, rename entries of the at least one architectural rename table structure supporting the cleared-register encoding.

6. The apparatus according to clause 5, in which:
  in response to detection that the commit point of program flow has reached a point of program flow at which the register clearing event occurred, the register commit circuitry is configured to set a plurality of rename entries of the at least one architectural rename table structure to the cleared-register encoding.

7. The apparatus according to clause 6, in which:
  following a given rename entry of the at least one architectural rename table being set to the cleared-register encoding, the given rename entry corresponding to a given architectural register and specifying the given architectural register as being mapped to a given physical register prior to being set to the cleared-register encoding, the register commit circuitry is configured to defer freeing the given physical register until after commitment of a subsequent operation that is younger than the point of program flow at which the register clearing event occurred and specifies the given architectural register as a destination register, where freeing the given physical register comprises making the given physical register available for reallocation to another architectural register.

8. The apparatus according to any of clauses 5 to 7, in which the register commit circuitry is responsive to an operation being committed which specifies a given architectural register as a destination register, when a given rename entry of the at least one register rename table structure corresponding to the given architectural register is set to the cleared-register encoding, to:
  free, for reallocation to a new architectural register, a previously mapped physical register previously specified by the given rename entry as being mapped to the given architectural register prior to the given rename entry being set to the cleared-register encoding;
  set the given rename entry to an encoding other than the cleared-register encoding.

9. The apparatus according to any of clauses 5 to 8, comprising flush control circuitry responsive to a flush event for triggering flushing of operations beyond a flush point of program and flow, to cause the at least one speculative register rename table structure to be reset based on the committed register mappings indicated in the at least one architectural rename table structure, and to rebuild the at least one speculative register rename table structure based on register mappings indicated by a register commit queue as being associated with points of program flow between the commit point and the flush point in program order; in which
  when rebuilding the at least one speculative register rename table, in response to detection that the register clearing event occurred at a point of program flow between the commit point of program flow and the flush point of program flow, the flush control circuitry is configured to set the plurality of rename entries of the register rename table to the cleared-register encoding.

10. The apparatus according to any of clauses 5 to 9, comprising a register commit queue comprising a plurality of register mapping entries representing a queue of register mappings associated with respective points of program flow; in which:
  the register rename circuitry is responsive to detection of the register clearing event to allocate, to the register commit queue, a register clearing entry indicative of a point of program flow at which the register clearing event occurred; and the register commit circuitry is configured to detect, based on the register clearing entry, a point of program flow at which the register clearing event occurred.

11. The apparatus according to any of clauses 1 to 10, in which the register clearing event comprises a mode change of the processing circuitry between a first mode and a second mode.

12. The apparatus according to clause 11, in which the processing circuitry is configured to trigger the mode change in response to a mode changing program instruction included in a stream of instructions to be executed by the processing circuitry.

13. The apparatus according to any of clauses 11 and 12, in which the first mode and the second mode are associated with different register lengths for at least a subset of the at least one set of architectural registers.

14. The apparatus according to any of clauses 11 to 13, in which in the second mode, the processing circuitry is configured to offload for processing by an external processing unit at least one class of operations which in the first mode would be processed by the processing circuitry.

15. The apparatus according to clause 14, in which said at least one set of architectural registers includes a first set of architectural registers, where the register rename circuitry is responsible for selecting register mappings for the first set of architectural registers in the first mode, and in the second mode the register rename circuitry is not responsible for selecting register mappings for the first set of architectural registers because operations specifying the first set of architectural registers are to be offloaded to the external processing unit in the second mode;
  for a register clearing event comprising a mode change from the first mode to the second mode, the plurality of rename entries set to the cleared-register encoding comprises rename entries corresponding to the first set of architectural registers; and
  for a register clearing event comprising a mode change from the second mode to the first mode, the plurality of rename entries set to the cleared-register encoding excludes rename entries corresponding to the first set of architectural registers.

16. The apparatus according to clause 15, in which the first set of architectural registers comprise vector registers.

17. The apparatus according to any of clauses 15 and 16, in which for both the mode change from the first mode to the second mode and the mode change from the second mode to the first mode, the plurality of rename entries set to the cleared-register encoding includes rename entries corresponding to a second set of architectural registers for which the register rename circuitry is responsible for selecting register mappings in both the first mode and the second mode.

18. The apparatus according to clause 17, wherein the second set of architectural registers comprise predicate registers.

19. A system comprising:
  the apparatus of any of clauses 1 to 18, implemented in at least one packaged chip;
  at least one system component; and
  a board,
  wherein the at least one packaged chip and the at least one system component are assembled on the board.

20. A chip-containing product comprising the system of clause 19 assembled on a further board with at least one other product component.

21. A non-transitory computer-readable medium to store computer-readable code for fabrication of an apparatus comprising:
  at least one register rename table structure comprising rename entries for indicating register mappings between architectural registers specified by operations to be processed by processing circuitry and corresponding physical registers provided in hardware; and
  register rename circuitry to update the register mappings indicated by the rename entries of the at least one register rename table structure; in which:
  rename entries corresponding to at least one set of architectural registers support a cleared-register encoding;

in response to an operation specifying a source architectural register for which a corresponding rename entry is set to the cleared-register encoding, the register rename circuitry is configured to control the processing circuitry to process that operation with a source operand corresponding to the source architectural register being treated as having a predetermined value; and in response to detection of a register clearing event indicating that at least one set of architectural registers is to be treated as having been cleared to the predetermined value, the register rename circuitry is configured to set a plurality of rename entries of the at least one register rename table to the cleared-register encoding, the plurality of rename entries corresponding to architectural registers in said at least one set of architectural registers.

22. A method comprising:

maintaining at least one register rename table structure comprising rename entries for indicating register mappings between architectural registers specified by operations to be processed by processing circuitry and corresponding physical registers provided in hardware, where rename entries corresponding to at least one set of architectural registers support a cleared-register encoding;

in response to an operation specifying a source architectural register for which a corresponding rename entry is set to the cleared-register encoding, controlling processing circuitry to process that operation with a source operand corresponding to the source architectural register being treated as having a predetermined value; and in response to detection of a register clearing event indicating that at least one set of architectural registers is to be treated as having been cleared to the predetermined value, setting a plurality of rename entries of the at least one register rename table to the cleared-register encoding, the plurality of rename entries corresponding to architectural registers in said at least one set of architectural registers.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

at least one register rename table structure comprising rename entries for indicating register mappings between architectural registers specified by operations to be processed by processing circuitry and corresponding physical registers provided in hardware; and register rename circuitry configured to update the register mappings indicated by the rename entries of the at least one register rename table structure; in which:

rename entries corresponding to at least one set of architectural registers support a cleared-register encoding;

in response to an operation specifying a source architectural register for which a corresponding rename entry is set to the cleared-register encoding, the register rename circuitry is configured to control the processing circuitry to process that operation with a source operand corresponding to the source architectural register being treated as having a predetermined value; and in response to detection of a register clearing event indicating that at least one set of architectural registers is to be treated as having been cleared to the predetermined value, the register rename circuitry is configured to set a plurality of rename entries of the at least one register rename table to the cleared-register encoding, the plurality of rename entries corresponding to architectural registers in said at least one set of architectural registers.

2. The apparatus according to claim 1, in which the register rename circuitry is configured to set the plurality of rename entries to the cleared-register encoding in response to a single micro-operation representing the register clearing event.

3. The apparatus according to claim 1, in which the rename entries corresponding to the at least one set of architectural registers each comprise a cleared-register bit, and the cleared-register encoding comprises an encoding in which the cleared-register bit is set to a predetermined value, and in which the at least one register rename table structure has at least one write port configured to control setting of the cleared-register bits in two or more of the plurality of rename entries in response to a single trigger signal input to the at least one write port.

4. The apparatus according to claim 1, in which:

the at least one register rename table structure comprises at least one speculative register rename table structure comprising rename entries for indicating speculative register mappings for speculatively processed operations; and the apparatus comprises register commit circuitry to maintain, in response to commitment of operations processed by the processing circuitry, at least one architectural rename table structure comprising rename entries for indicating committed register mappings associated with a commit point of program flow, rename entries of the at least one architectural rename table structure supporting the cleared-register encoding.

5. The apparatus according to claim 4, in which:

in response to detection that the commit point of program flow has reached a point of program flow at which the register clearing event occurred, the register commit circuitry is configured to set a plurality of rename entries of the at least one architectural rename table structure to the cleared-register encoding.

6. The apparatus according to claim 5, in which:
following a given rename entry of the at least one architectural rename table being set to the cleared-register encoding, the given rename entry corresponding to a given architectural register and specifying the given architectural register as being mapped to a given physical register prior to being set to the cleared-register encoding, the register commit circuitry is configured to defer freeing the given physical register until after commitment of a subsequent operation that is younger than the point of program flow at which the register clearing event occurred and specifies the given architectural register as a destination register, where freeing the given physical register comprises making the given physical register available for reallocation to another architectural register.

7. The apparatus according to claim 4, in which the register commit circuitry is responsive to an operation being committed which specifies a given architectural register as a destination register, when a given rename entry of the at least one register rename table structure corresponding to the given architectural register is set to the cleared-register encoding, to:
free, for reallocation to a new architectural register, a previously mapped physical register previously specified by the given rename entry as being mapped to the given architectural register prior to the given rename entry being set to the cleared-register encoding; and
set the given rename entry to an encoding other than the cleared-register encoding.

8. The apparatus according to claim 4, comprising flush control circuitry responsive to a flush event for triggering flushing of operations beyond a flush point of program flow, to cause the at least one speculative register rename table structure to be reset based on the committed register mappings indicated in the at least one architectural rename table structure, and to rebuild the at least one speculative register rename table structure based on register mappings indicated by a register commit queue as being associated with points of program flow between the commit point and the flush point in program order; in which
when rebuilding the at least one speculative register rename table, in response to detection that the register clearing event occurred at a point of program flow between the commit point of program flow and the flush point of program flow, the flush control circuitry is configured to set the plurality of rename entries of the register rename table to the cleared-register encoding.

9. The apparatus according to claim 4, comprising a register commit queue comprising a plurality of register mapping entries representing a queue of register mappings associated with respective points of program flow; in which:
the register rename circuitry is responsive to detection of the register clearing event to allocate, to the register commit queue, a register clearing entry indicative of a point of program flow at which the register clearing event occurred; and
the register commit circuitry is configured to detect, based on the register clearing entry, a point of program flow at which the register clearing event occurred.

10. The apparatus according to claim 1, in which the register clearing event comprises a mode change of the processing circuitry between a first mode and a second mode.

11. The apparatus according to claim 10, in which the first mode and the second mode are associated with different register lengths for at least a subset of the at least one set of architectural registers.

12. The apparatus according to claim 10, in which in the second mode, the processing circuitry is configured to offload for processing by an external processing unit at least one class of operations which in the first mode would be processed by the processing circuitry.

13. The apparatus according to claim 12, in which said at least one set of architectural registers includes a first set of architectural registers, where the register rename circuitry is responsible for selecting register mappings for the first set of architectural registers in the first mode, and in the second mode the register rename circuitry is not responsible for selecting register mappings for the first set of architectural registers because operations specifying the first set of architectural registers are to be offloaded to the external processing unit in the second mode;
for a register clearing event comprising a mode change from the first mode to the second mode, the plurality of rename entries set to the cleared-register encoding comprises rename entries corresponding to the first set of architectural registers; and
for a register clearing event comprising a mode change from the second mode to the first mode, the plurality of rename entries set to the cleared-register encoding excludes rename entries corresponding to the first set of architectural registers.

14. The apparatus according to claim 13, in which the first set of architectural registers comprise vector registers.

15. The apparatus according to claim 13, in which for both the mode change from the first mode to the second mode and the mode change from the second mode to the first mode, the plurality of rename entries set to the cleared-register encoding includes rename entries corresponding to a second set of architectural registers for which the register rename circuitry is responsible for selecting register mappings in both the first mode and the second mode.

16. A system comprising:
the apparatus of claim 1, implemented in at least one packaged chip;
at least one system component; and
a board,
wherein the at least one packaged chip and the at least one system component are assembled on the board.

17. A chip-containing product comprising the system of claim 16 assembled on a further board with at least one other product component.

18. A non-transitory computer-readable medium to store computer-readable code for fabrication of an apparatus comprising:
at least one register rename table structure comprising rename entries for indicating register mappings between architectural registers specified by operations to be processed by processing circuitry and corresponding physical registers provided in hardware; and
register rename circuitry to update the register mappings indicated by the rename entries of the at least one register rename table structure; in which:
rename entries corresponding to at least one set of architectural registers support a cleared-register encoding;
in response to an operation specifying a source architectural register for which a corresponding rename entry is set to the cleared-register encoding, the register rename circuitry is configured to control the processing circuitry to process that operation with a source operand corresponding to the source architectural register being treated as having a predetermined value; and in response to detection of a register clearing event indicating that at least one set of architectural registers is to be treated as having been cleared to the predetermined value, the register rename circuitry is configured to set a plurality of rename entries of the at least one register rename table to the cleared-register encoding, the plurality of rename entries corresponding to architectural registers in said at least one set of architectural registers.

19. An apparatus comprising:

at least one register rename table structure comprising rename entries for indicating register mappings between architectural registers specified by operations to be processed by processing circuitry and corresponding physical registers provided in hardware; and register rename circuitry configured to update the register mappings indicated by the rename entries of the at least one register rename table structure; in which:

rename entries corresponding to at least one set of architectural registers support a cleared-register encoding, in which the rename entries corresponding to the at least one set of architectural registers each comprise a cleared-register bit, and the cleared-register encoding comprises an encoding in which the cleared-register bit is set to a predetermined bit value;

in response to an operation specifying a source architectural register for which a corresponding rename entry is set to the cleared-register encoding, the register rename circuitry is configured to control the processing circuitry to process that operation with a source operand corresponding to the source architectural register being treated as having a predetermined value; and in response to detection of a register clearing event indicating that at least one set of architectural registers is to be treated as having been cleared to the predetermined value, the register rename circuitry is configured to set a plurality of rename entries of the at least one register rename table to the cleared-register encoding, the plurality of rename entries corresponding to architectural registers in said at least one set of architectural registers.

\* \* \* \* \*